United States Patent
Gruben

(10) Patent No.: US 10,609,486 B1
(45) Date of Patent: Mar. 31, 2020

(54) CONVERTIBLE HEADPHONE/VISUAL EXPERIENCE APPARATUS

(71) Applicant: Jacob Yasha Gruben, New York, NY (US)

(72) Inventor: Jacob Yasha Gruben, New York, NY (US)

( * ) Notice: Subject to any disclaimer, the term of this patent is extended or adjusted under 35 U.S.C. 154(b) by 0 days.

(21) Appl. No.: 16/269,429

(22) Filed: Feb. 6, 2019

(51) Int. Cl.
| H04R 5/033 | (2006.01) |
| H04R 1/10 | (2006.01) |
| G06T 19/00 | (2011.01) |
| G02B 27/01 | (2006.01) |

(52) U.S. Cl.
CPC ....... *H04R 5/0335* (2013.01); *G02B 27/0176* (2013.01); *G06T 19/006* (2013.01); *H04R 1/105* (2013.01); *H04R 1/1008* (2013.01); *G02B 2027/0158* (2013.01); *G02B 2027/0178* (2013.01); *H04R 2420/07* (2013.01)

(58) Field of Classification Search
CPC ........ G02B 27/0176; G02B 2027/0158; G02B 2027/0178; G06T 19/006; H04R 1/105; H04R 1/1008; H04R 5/0335; H04R 2420/07
See application file for complete search history.

(56) References Cited

U.S. PATENT DOCUMENTS

2017/0353798 A1* 12/2017 Garan ............... H04R 5/033
2018/0217798 A1* 8/2018 Urbach ............. G09G 3/001

\* cited by examiner

*Primary Examiner* — Brian Ensey
(74) *Attorney, Agent, or Firm* — Patent Ingenuity, P.C.; Samuel K. Simpson

(57) ABSTRACT

An apparatus has a left earpiece having one or more left audio speakers integrated therein, and a left rotatable member that rotates about an axis of the left earpiece while the left earpiece is stationary. The apparatus also has a right earpiece having one more right audio speakers integrated therein, and a right rotatable member that rotates about an axis of the right earpiece while the right earpiece is stationary. The apparatus has a headband that is operably connected to the left rotatable member and the right rotatable member. The headband is rotated to a headphone position on top of a head of a user during operation of the apparatus as a set of headphones, whereas the headband is rotated to a visual experience position at an eyebrow position of the user. The apparatus also has a display device that is operably connected to the headband.

18 Claims, 25 Drawing Sheets

CONVERTIBLE HEADPHONE/VISUAL EXPERIENCE APPARATUS

BACKGROUND

1. Field

This disclosure generally relates to audio/visual ("A/V") equipment. More particularly, the disclosure relates to an A/V apparatus that provides an immersive experience.

2. General Background

Virtual reality ("VR") and augmented reality ("AR") are the two most common immersive experience technologies. Whereas a VR apparatus typically provides a total virtual, immersive experience, an AR apparatus typically provides a virtual experience in conjunction with a real-world experience (e.g., an overlay of various text and/or images over a real-world object, person, place, etc.).

Typically, a head-mounted display device (e.g., headgear, glasses, etc.) is worn by the user over his or her eyes, either to provide a VR or an AR experience. Yet, conventional head-mounted display devices are often cumbersome, often having uncomfortable adhering mechanisms (e.g., bulky straps) and heavy electronic componentry (e.g., large display screen). As a result, current VR/AR apparatuses often lead to user discomfort and inconvenience, which distracts from overall enjoyment of the user's immersive experience.

SUMMARY

In one embodiment, an apparatus has a left earpiece having one or more left audio speakers integrated therein, and a left rotatable member that rotates about an axis of the left earpiece while the left earpiece is stationary. The apparatus also has a right earpiece having one more right audio speakers integrated therein, and a right rotatable member that rotates about an axis of the right earpiece while the right earpiece is stationary.

Moreover, the apparatus has a headband that is operably connected to the left rotatable member and the right rotatable member. The headband is rotated to a headphone position on top of a head of a user during operation of the apparatus as a set of headphones, whereas the headband is rotated to a visual experience ("VE") position at an eyebrow position of the user. The apparatus also has a display device, which displays the VE, that is operably connected to the headband.

In an alternative embodiment, the headband has a left non-display device portion operably connected to the left rotatable member and a right non-display device portion operably connected to the right rotatable member. The headband also has a display device portion that displays the visual experience. The headband may be rotated to a VE position at one or more eyes of the user.

In another embodiment, the apparatus has a first headband member operably connected to the left earpiece and the right earpiece such that the first headband member is fixed at a headphone position on top of a head of a user during operation of the apparatus as a set of headphones. Further, the apparatus has a second headband member that is operably connected to the left rotatable member and the right rotatable member. The second headband member is rotated to a headphone position on top of a head of a user during operation of the apparatus as a set of headphones, and rotated to a VE position at an eyebrow position of the user. Further, the apparatus has a display device, which displays the VE, that is operably connected to the second headband member.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A convertible headphone/VE apparatus provides a user with a device that delivers audio, and is convertible into a device that provides a VE, such as an AR/VR immersive experience. In other words, the convertible headphone/VE apparatus may be configured to act as a set of headphones in a first position, delivering solely audio (e.g., music) to the user. The convertible headphone/VE apparatus may then be adjusted to a second position that provides a VE (e.g., imagery, video, text, etc.) via a display device, and, optionally, audio via the audio speakers in corresponding earpieces for a VE, such as AR/VR.

Figure 1A:
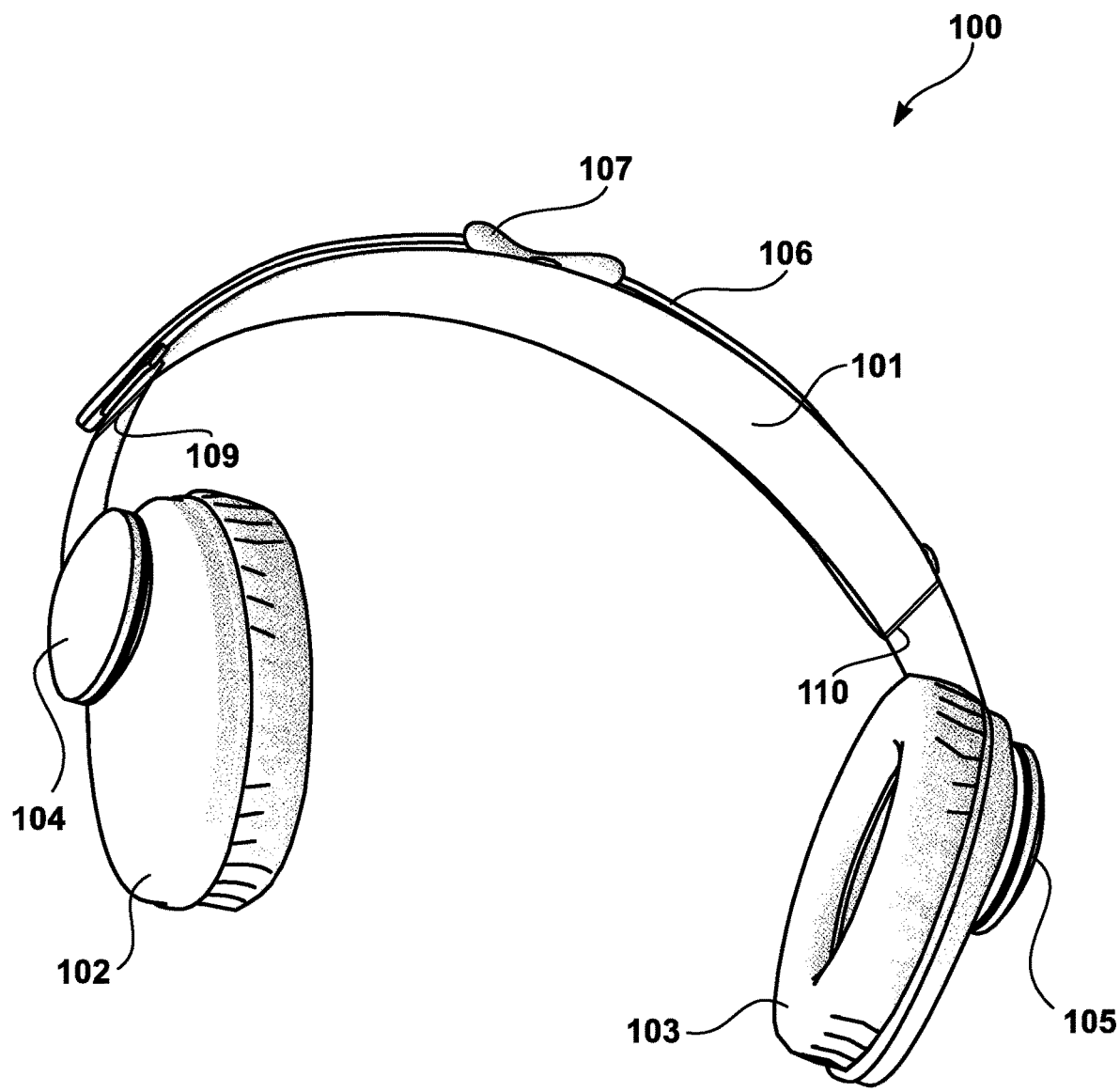
FIG. 1A illustrates the convertible headphone/VE apparatus in a headphone position.
Figure 1B:
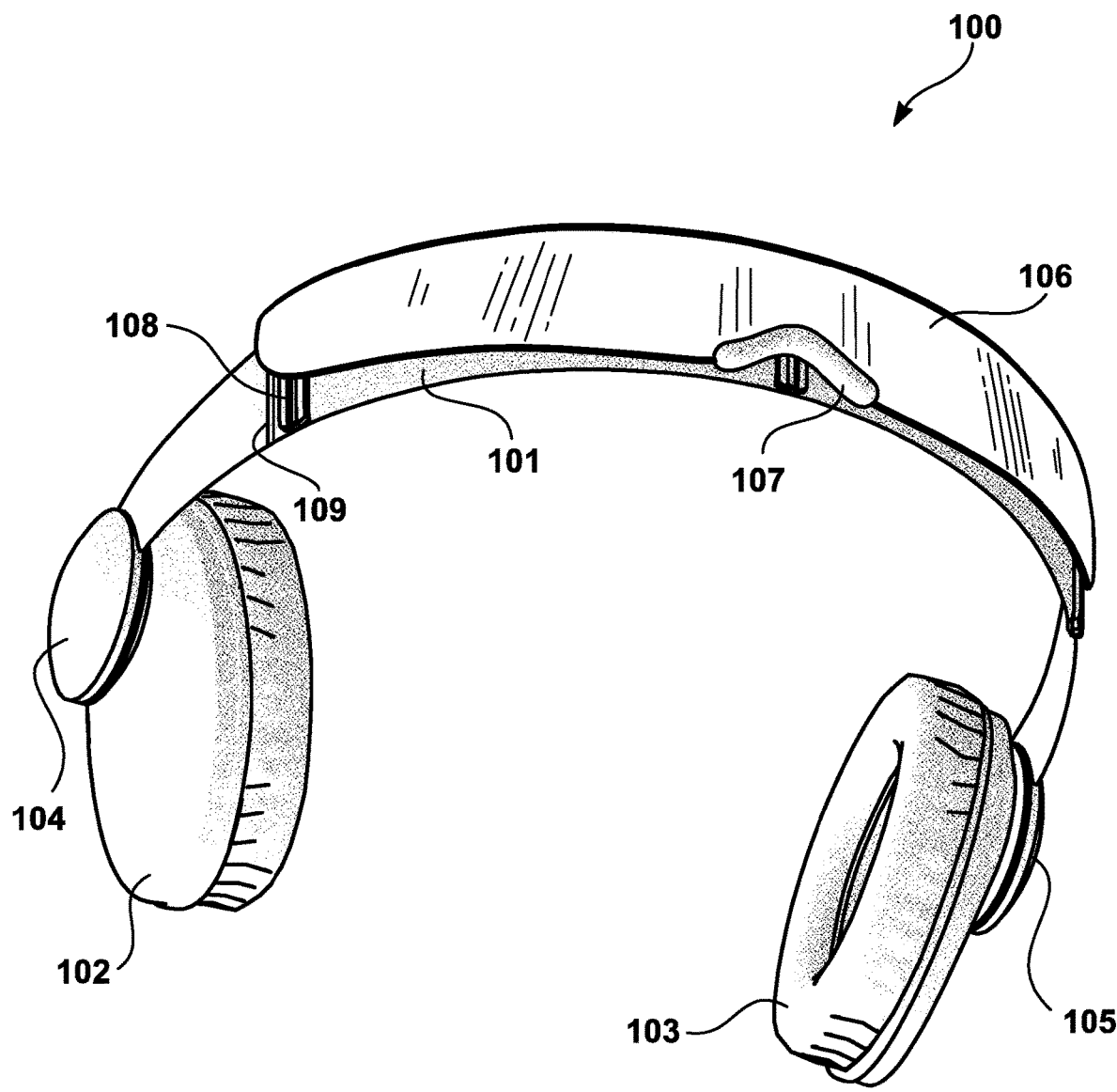
FIG. 1B illustrates the convertible headphone/VE apparatus being converted to a VE position.
Figure 1C:
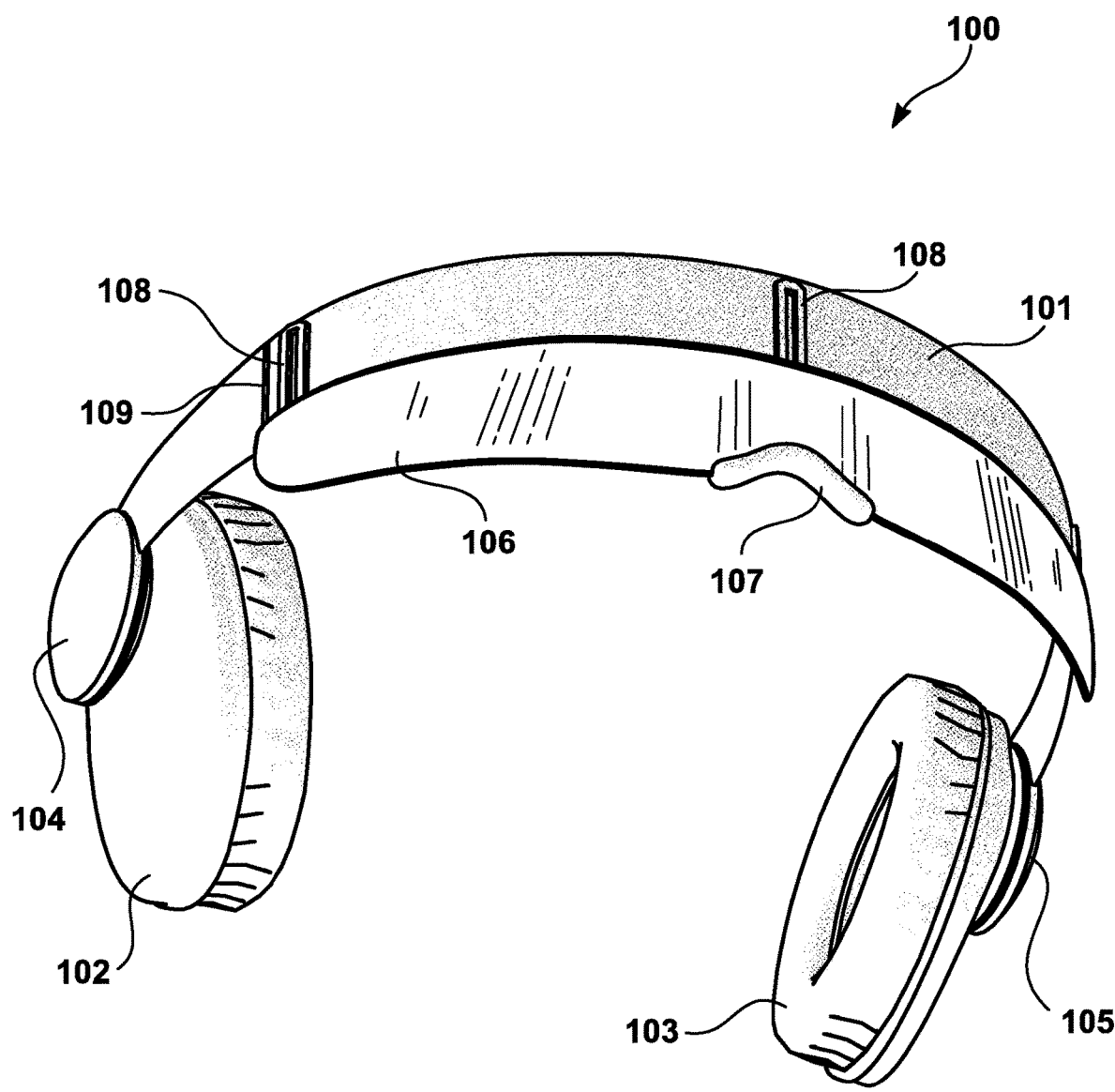
FIG. 1C illustrates the convertible headphone/VE apparatus in a VE position a released display device.

FIG. 1A-1C illustrate various perspective views of a convertible headphone/VE apparatus 100 in different positions. For instance, FIG. 1A illustrates the convertible headphone/VE apparatus 100 in a headphone position. In other words, the convertible headphone/VE apparatus 100 may be positioned on the head of a user to be worn as headphones for listening to audio (e.g., music).

The convertible headphone/VE apparatus 100 includes a left earpiece 102 and a right earpiece 103, each of which may be positioned over an ear of the user. The earpieces 102 and 103 may engulf the ears of the user, or may just rest on top of the ears of the user. Further, the earpieces 102 and 103 may be fabricated from various materials (leather, plastic, etc.) to provide varying levels of comfort/cushion to the ears of the user. One or more audio speakers may be integrated into each of the earpieces 102 and 103 to deliver audio to the ears of the user.

The audio may be delivered to the audio speakers via various connections (e.g., wireless or wired). In one embodiment, the convertible headphone/VE apparatus 100 has a transceiver that establishes a wireless connection with an external computing device (e.g., smartphone, tablet device, wearable device, desktop computer, laptop computer, etc.). In yet another embodiment, the convertible headphone/VE apparatus 100 has one or more connectors/ports (e.g., USB) for establishing a wired connection to the external computing device.

In one embodiment, the convertible headphone/VE apparatus 100 has a left hinge point 109 and a right hinge point 110. Accordingly, the convertible headphone/VE apparatus 100 may be folded/collapsed at the hinge points 109 and 110. In an alternative embodiment, the convertible headphone/VE apparatus 100 does not have hinge points 109 and 110, thereby being non-foldable/non-collapsible.

FIG. 1B illustrates the convertible headphone/VE apparatus 100 being converted to a VE position. In one embodiment, the headband 101 is operably attached, or connected, to a left rotatable member 104 and a right rotatable member 105, each of which is rotatable about an axis of corresponding earpieces 102 and 103. In other words, the headband 101, which was in an upright position (FIG. 1A) to be situated on top of a head of a user, is rotated in a downward motion, via the rotatable members 104 and 105, to a position in which the headband 101 is positioned approximately above one or more eyebrows of a user. For example, the headband 101 may be rotated from an upright position, with respect to a head of a user, to a perpendicular position.

As an example, the rotatable members 104 and 105 may encompass rotatable discs within outer casings. Accordingly, the headband 101 may be rotated about an axis of the earpieces 104 and 105 while the earpieces 104 and 105 remain stationary. Other than the movement of the headband 101, the rotation of the rotatable members 104 and 105 may be hidden via the outer casings. Alternatively, the rotatable members 104 and 105 may not be hidden by outer casings (e.g., transparent casings), so as to allow for viewing of the rotational movement.

Although the rotatable members 104 and 105 are illustrated as being smaller than the earpieces 102 and 103, the rotatable members 104 and 105 may, alternatively, be larger in circumference than the earpieces 102 and 103. In other words, from the exterior, the rotatable members 102 and 103 may engulf the earpieces 102 and 103 so that rotation occurs around the circumferences of the earpieces 102 and 103 without movement of the earpieces 102 and 103 on the ears of the user. As a result, the earpieces 102 and 103 may be hidden from external view when worn by the user.

Further, FIG. 1C illustrates the convertible headphone/VE apparatus 100 in a VE position. As an example, the headband 101 may have one or more grooves/tracks 108 along which a display device (e.g., AR glasses) may move so that the display device 106 is positioned over one or more eyes of a user. For instance, one or more connectors (e.g., knobs) may be slid along the grooves/tracks 108 to allow the display device 106 to be released into the VE position. Conversely, the display device 106 may be retracted to a position in which one or more edges of the display device 106 are flush with one or more edges of the headband 101, as illustrated in FIG. 1B.

In one embodiment, the user may pull the display device 106 along the grooves/tracks 108 in order to retract/release the display device with respect to the headband 101. In another embodiment, the convertible headphone/VE apparatus 100 may have one or more actuators that release and/or retract the display device 106. For example, an actuator (e.g., button) may be positioned on, or integrated within, one, or both, of the rotatable members 104 and 105. For instance, pressing the button positioned on the rotatable member 104 may release a locking device integrated into the headband 101 that releases the display device 106 from a locked position, whereas pressing the button positioned on the rotatable member 105 may release a locking device integrated into one, or both, of the rotatable members 104 and 105 to release the headband 101 from an upright position. As another example, a button may be positioned on the headband 101 itself to unlock the display device 106. As yet another example, a left and right locking mechanism may be positioned in both of the rotatable members 104 and 105 such that two buttons, positioned on each rotatable member 104 and 105, have to be activated to release the headband 101 from a headphone position to a VE position, or vice versa. In one embodiment, the button may be pressure-sensitive such that a relatively light press is used to provide an input (e.g., wireless connectivity) and a relatively hard press unlocks the display device 106. Various types of locking mechanisms (e.g., spring-based, magnetic, grooves, etc.) may be used to perform the locking functionalities described herein. Further, the same, or different (e.g., left side to lock and right side to unlock), button may be used for locking and unlocking the display device 106. (The foregoing examples are provided only as examples since a variety of retraction/release mechanisms may be used to move the display device 106 to a position in which the user may view VE content via the display device 106.)

Moreover, a nosepiece 107 may be operably adhered (e.g., glued) or connected (e.g., one or more screws) to the display device 106. The nosepiece 107 may provide the user with cushion against a sharp edge of the display device 106, so the user may more readily enjoy the VE. Further, the nosepiece 107 may be retracted (FIG. 1B) so that the nosepiece 107 is substantially flush with an edge of the headband 101.

Figure 2A:
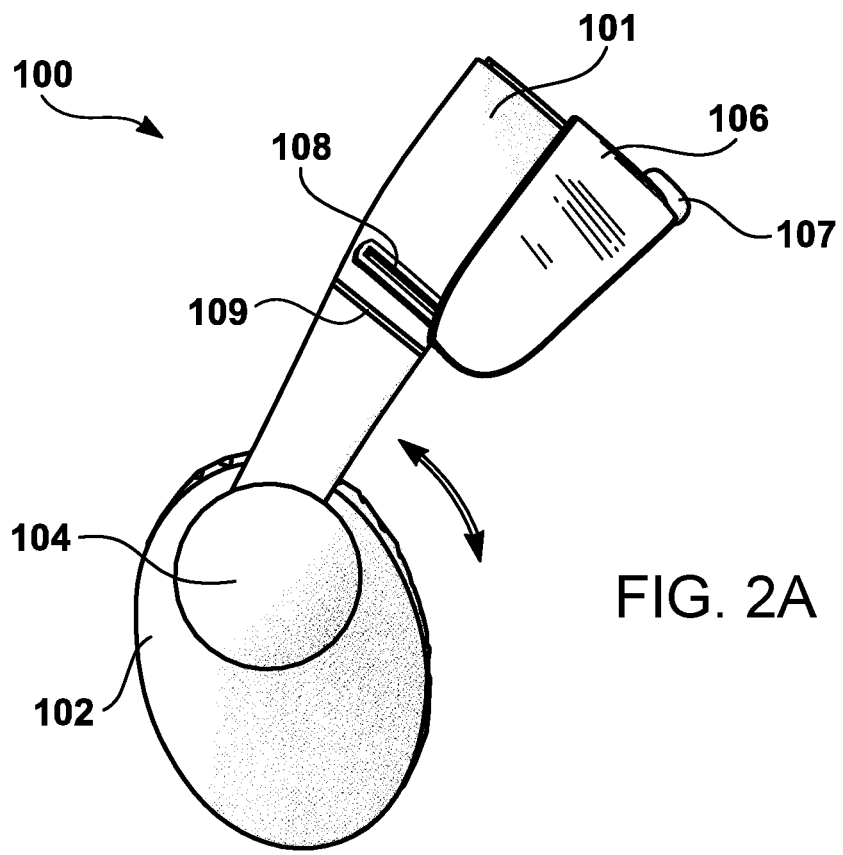
FIG. 2A illustrates the headband rotating about an axis of the left earpiece from either the headphone position or the VE position.
Figure 2B:
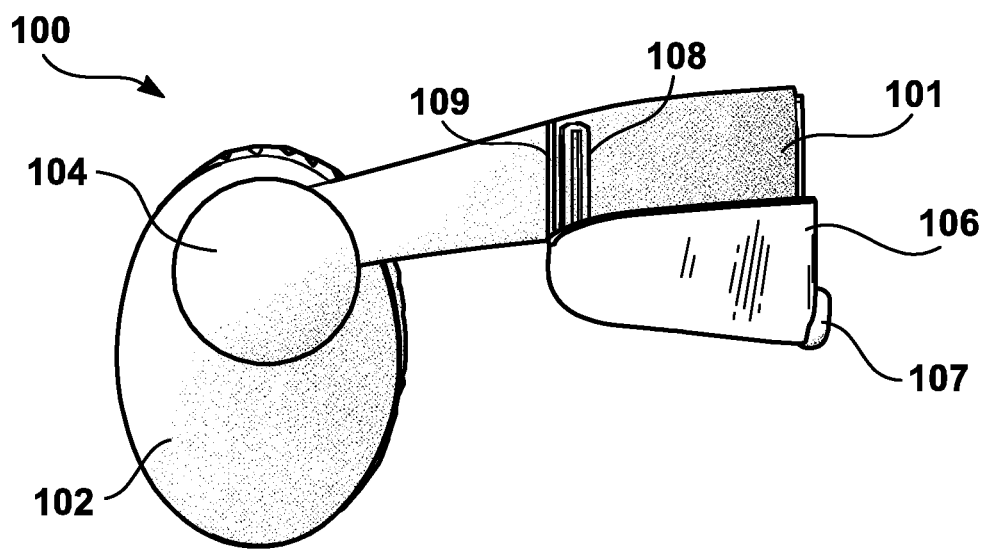
FIG. 2B illustrates the headband fully rotated about the axis of the left earpiece into the VE position.

Further, FIGS. 2A and 2B illustrate side views of exemplary movement of the headband 101 illustrated in FIGS. 1A-1C. In particular, FIG. 2A illustrates the headband 101 rotating about an axis of the left earpiece 104 from either the headphone position or the VE position. Further, FIG. 2B illustrates the headband 101 fully rotated about the axis of the left earpiece 104 into the VE position.

Figure 3:
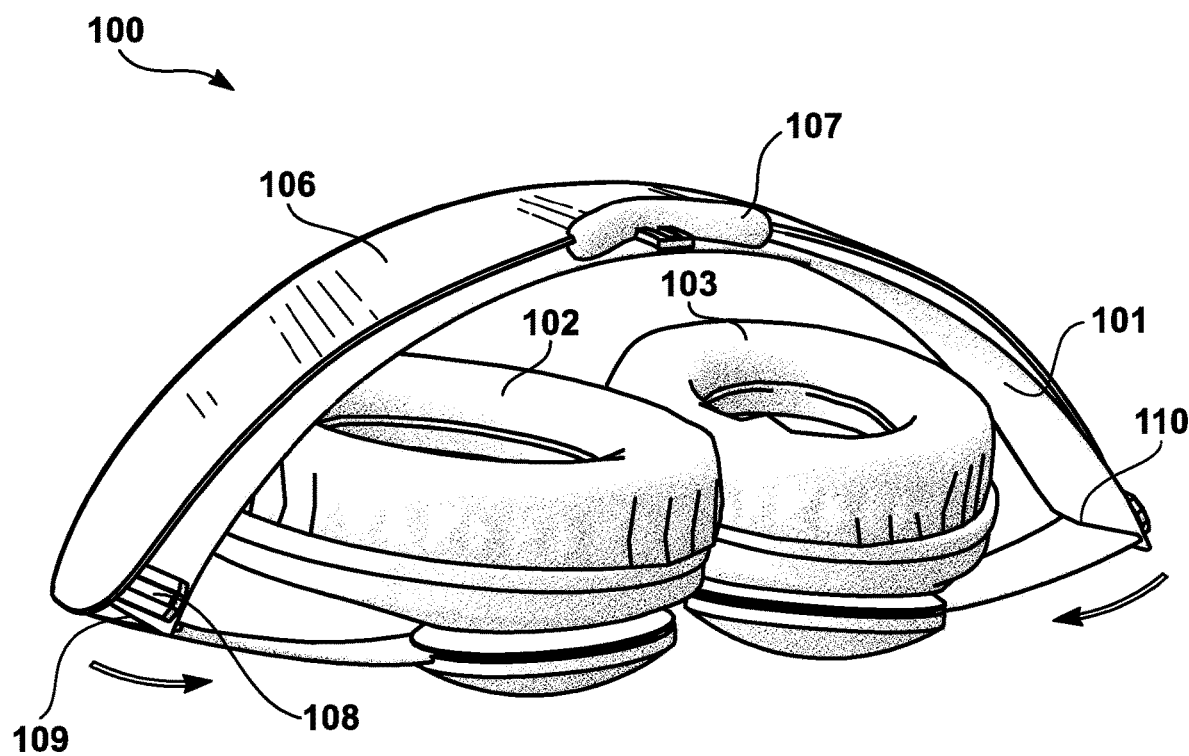
FIG. 3 illustrates a front perspective view of the convertible headphone/VE apparatus folded along the left hinge point and the right hinge point.

Moreover, FIG. 3 illustrates a front perspective view of the convertible headphone/VE apparatus 100 folded along the left hinge point 109 and the right hinge point 110. As a result, a user may conveniently fold the convertible headphone/VE apparatus 100 for easy storage during non-use.

Figure 4A:
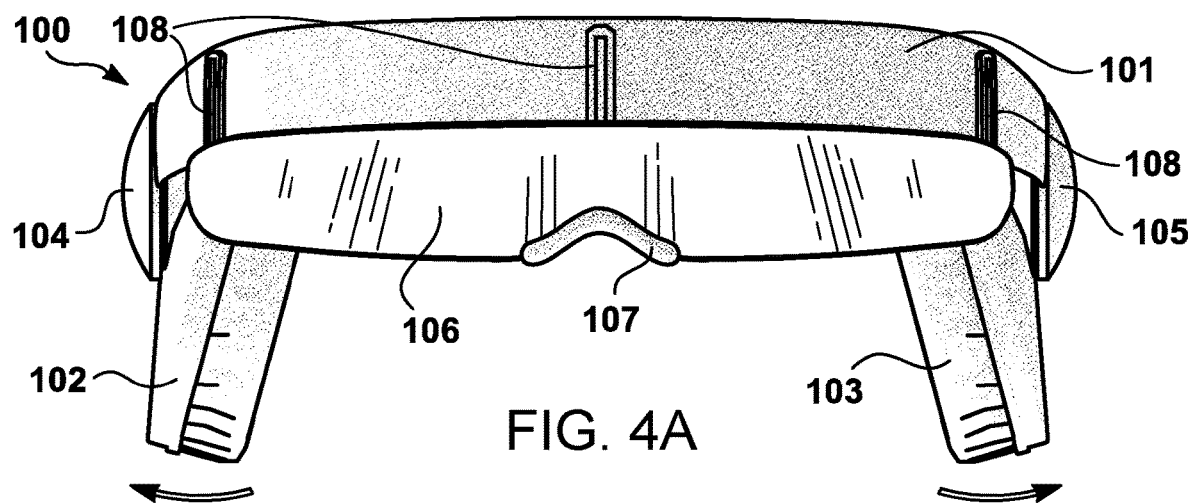
FIG. 4A illustrates outward motion of the earpieces with respect to the rotatable members.
Figure 4B:
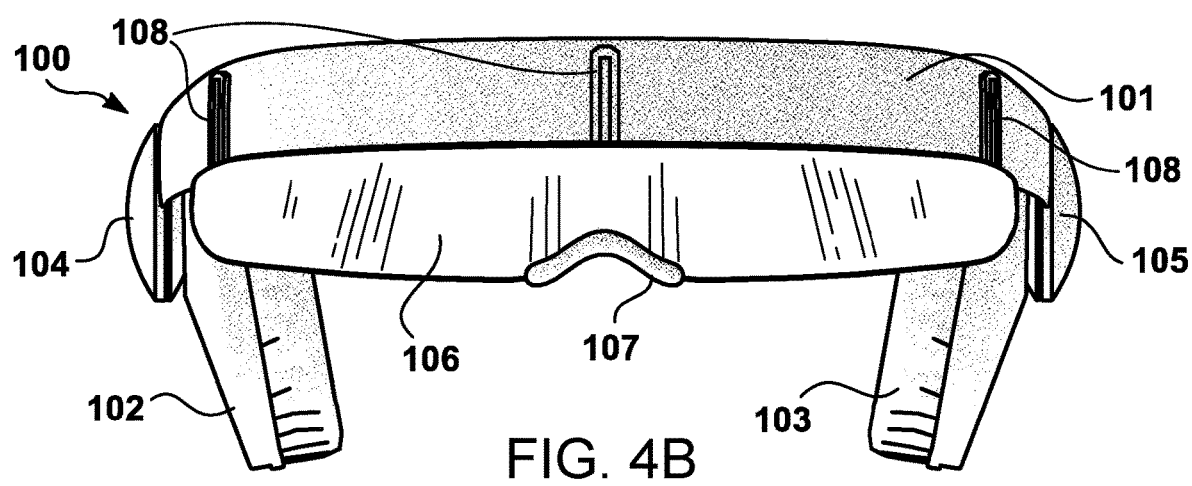
FIG. 4B illustrates the earpieces without any inward or outward motion.
Figure 4C:
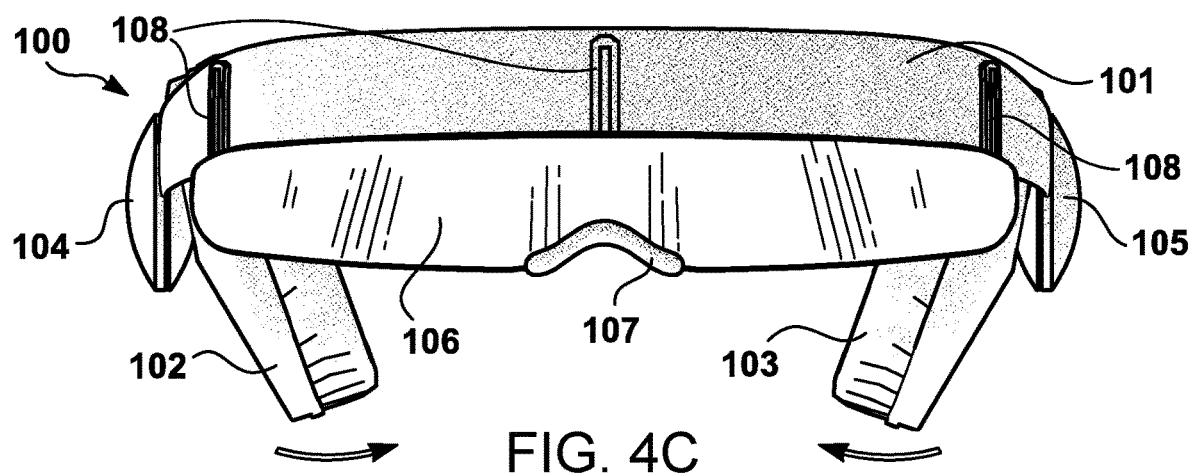
FIG. 4C illustrates the earpieces moving inwardly away from the rotatable members.

In one embodiment, the earpieces 102 and 103 have inward and outward flexibility with respect to the rotatable members 102 and 103, whether in the headphone position or the VE position. FIGS. 4A-4C illustrate inward and outward motion of the earpieces 102 and 103. For instance, FIG. 4A illustrates outward motion of the earpieces 102 and 103 with respect to the rotatable members 104 and 105. As an example, the earpieces 102 and 103 may have one more hinges attached to the inside of the rotatable members 104 and 105. FIG. 4B illustrates the earpieces 102 and 103 without any inward or outward motion. Finally, FIG. 4C illustrates the earpieces 102 and 103 moving inwardly away from the rotatable members 104 and 105.

Figure 5A:
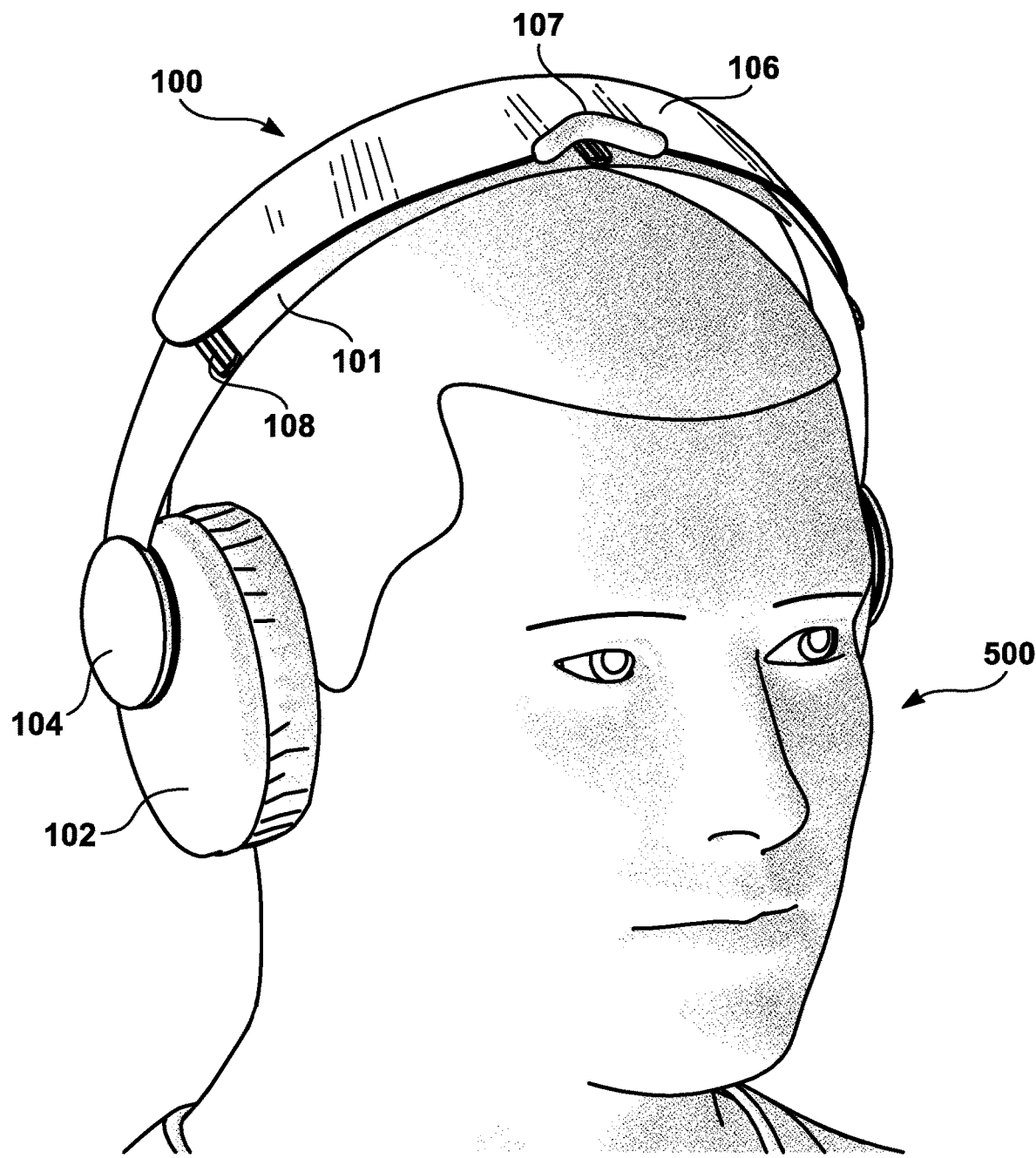
FIG. 5A illustrates the convertible headphone/VE apparatus in the headphone position.
Figure 5B:
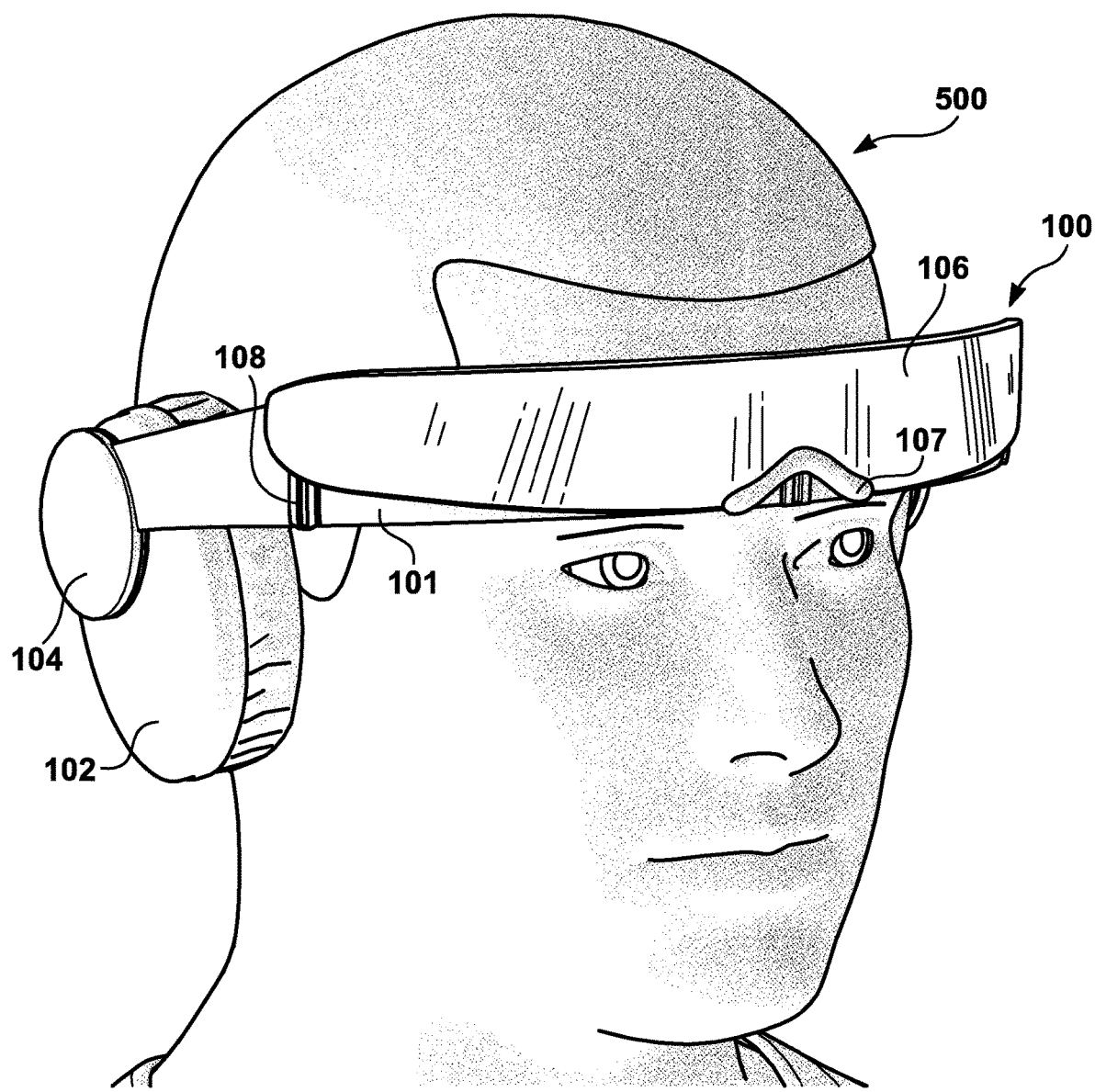
FIG. 5B illustrates the headband of the convertible headphone/VE apparatus being rotated into the VE position by the user.
Figure 5C:
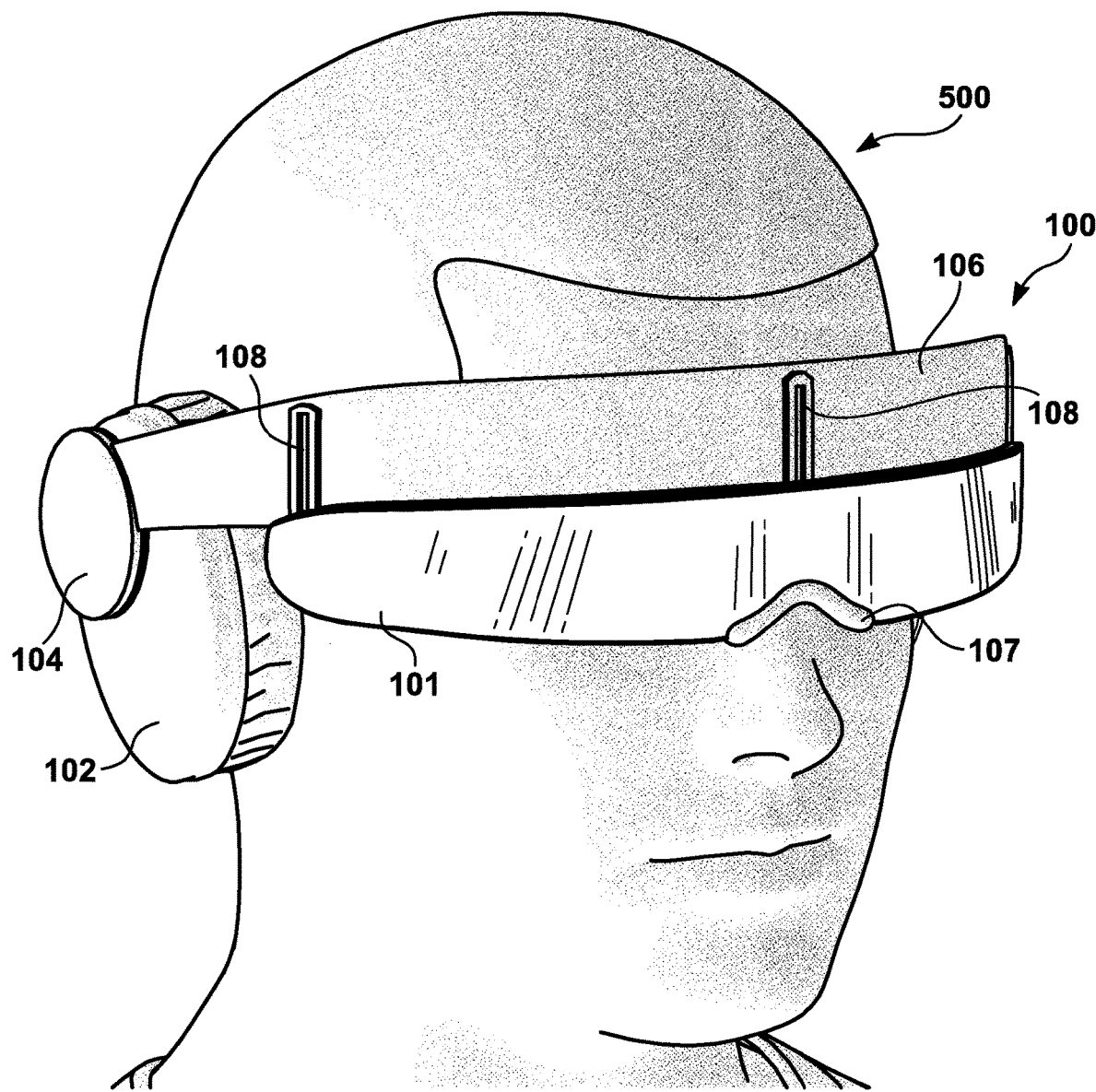
FIG. 5C illustrates the display device being released from the headband after the headband is rotated, as illustrated in FIG. 5B.

FIGS. 5A-5C illustrate an example of a user 500 wearing the convertible headphone/VE apparatus 100. FIG. 5A illustrates the convertible headphone/VE apparatus 100 in the headphone position. Accordingly, the user 500 may use the convertible headphone/VE apparatus 100 as a set of headphones to listen to audio (e.g., wireless receive music from a nearby smartphone).

FIG. 5B illustrates the headband 101 of the convertible headphone/VE apparatus 100 being rotated into the VE position by the user 500; the earpieces 104 and 105 remain relatively stationary during such rotation. As illustrated, the user 500 may rotate the headband 101 into the VE position with the display device 106 in the retracted position. Alternatively, the user 500 may release the display device 106 from the headband 101 prior to rotating the headband 101 to the VE position.

Finally, FIG. 5C illustrates the display device 106 being released from the headband 101 after the headband 101 is rotated, as illustrated in FIG. 5B. Although the convertible headphone/VE apparatus 100 is in the VE position, the earpieces 102 and 103 may continue to be used by the user 500, but for delivery of audio corresponding to the VE experience.

In an alternative embodiment, the convertible headphone/VE apparatus 100 illustrated in FIGS. 1A-5C does not have to have the entire headband 101 rotated from the headphone position to the VE position. FIGS. 6A-6F illustrate a convertible headphone/VE apparatus 600 that has a first headband member 602, which remains stationary on the head of the user 500 in either the headphone position or the VE position, and a second headband member 601 that is rotated from the headphone position to the VE position. In other words, the convertible headphone/VE apparatus 600 provides additional support over the top of the head of the user 500, even in the VE position.

Figure 6A:
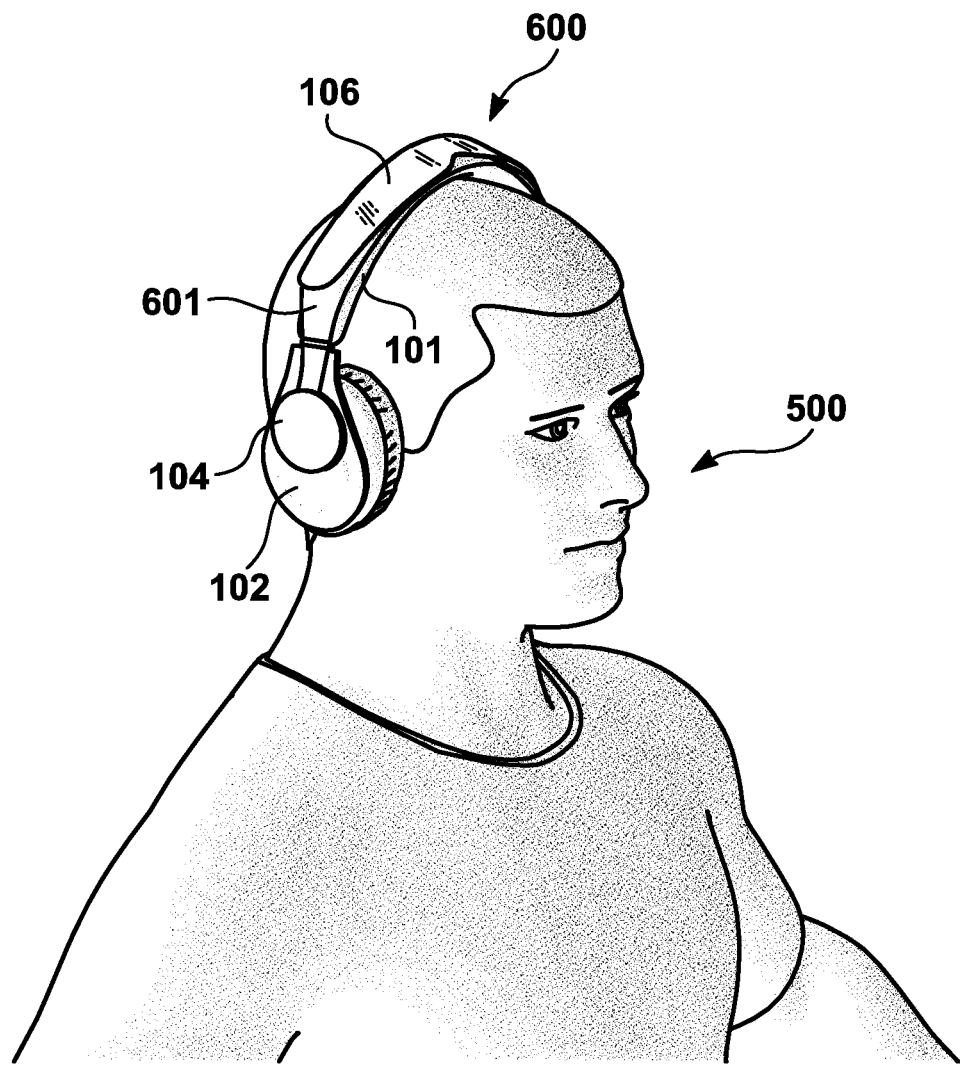
FIG. 6A illustrates the convertible headphone/VE apparatus in the headphone position being worn by the user.

FIG. 6A illustrates the convertible headphone/VE apparatus 600 in the headphone position being worn by the user 500. As an example, the first headband member 601 may overlay the second headband member 602 in the headphone position, essentially hiding the first headband member; in such an overlay position, the first headband member 601 and the second headband member 602 essentially form a single headband structure positioned on the top of the head of the user 500. In one embodiment, the first headband member 601 is operably connected via a locking mechanism (e.g., one or more magnets, clips, grooves, springs, etc.) to the second headband member 602. In other words, the first headband member 601 may be connected to the second headband member 602 to form the single headband structure in the headphone position, and unconnected to allow the second headband member 602 to be rotated to a VE position. In another embodiment, the first headband member 601 is positioned to overlay the second headband member 602, without any locking mechanism, to form the single headband structure positioned on the top of the head of the user 500.

Figure 6B:
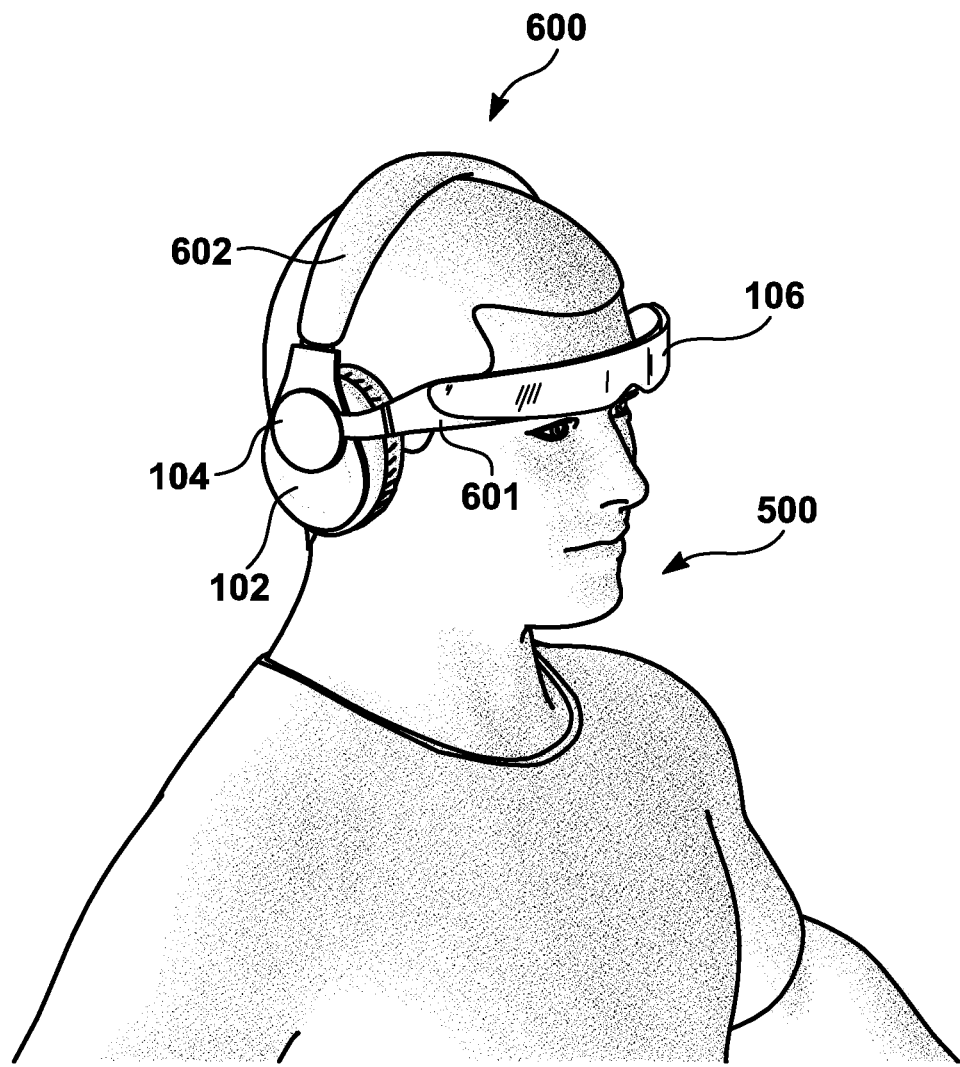
FIG. 6B illustrates the second headband member being rotated on the head of the user into the VE position with the display device in the retracted position.
Figure 6C:
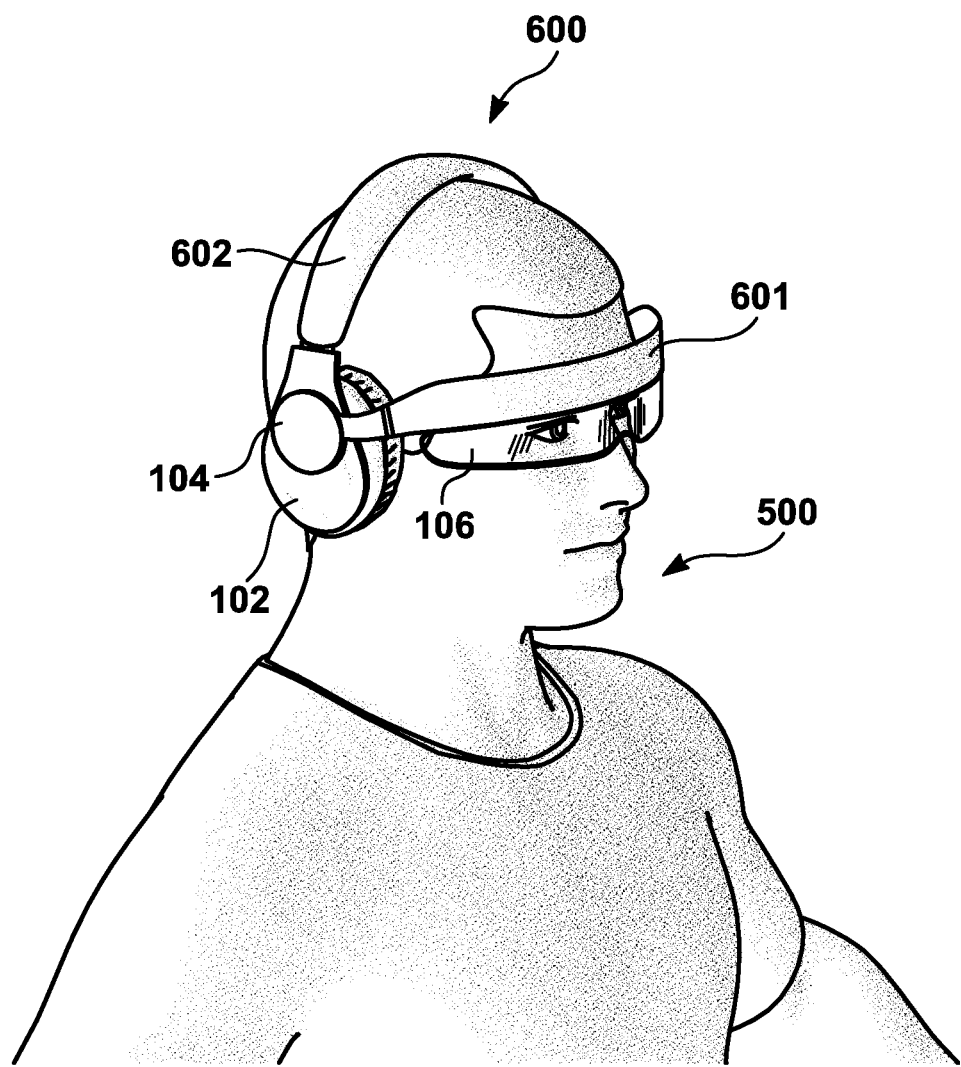
FIG. 6C illustrates the display device being released from the first headband member.
Figure 6D:
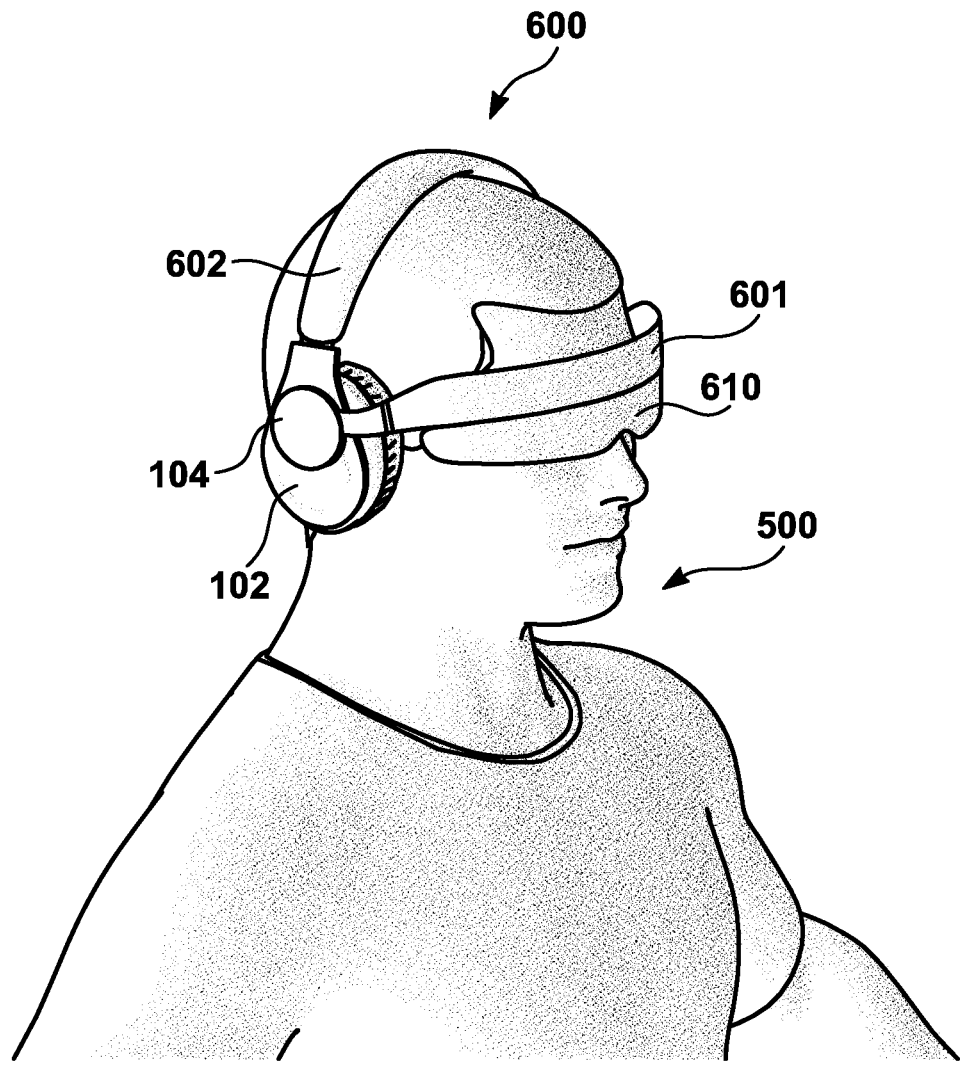
FIG. 6D illustrates an opaque display device, which may be used for any of the configurations described herein.

Further, FIG. 6B illustrates the first headband member 601 being rotated on the head of the user 500 into the VE position with the display device 106 in the retracted position. In one embodiment, the first headband member 601 is operably connected to the rotatable elements 104 and 105, whereas the second headband member 602 is operably connected to the earpieces 104 and 105. As a result, the first headband member 601 is rotatable from the headphone position to the VE position, but the second headband member 602 remains stationary with respect to the earpieces 102 and 103. FIG. 6C illustrates the display device 106 being released from the first headband member 601. Finally, FIG. 6D illustrates an opaque display device 610, which may be used for any of the configurations described herein. For example, the opaque display device 610 may be used for a VR experience, whereas the clear display device 106 (FIG. 6C) may be used for an AR experience.

Figure 6E:
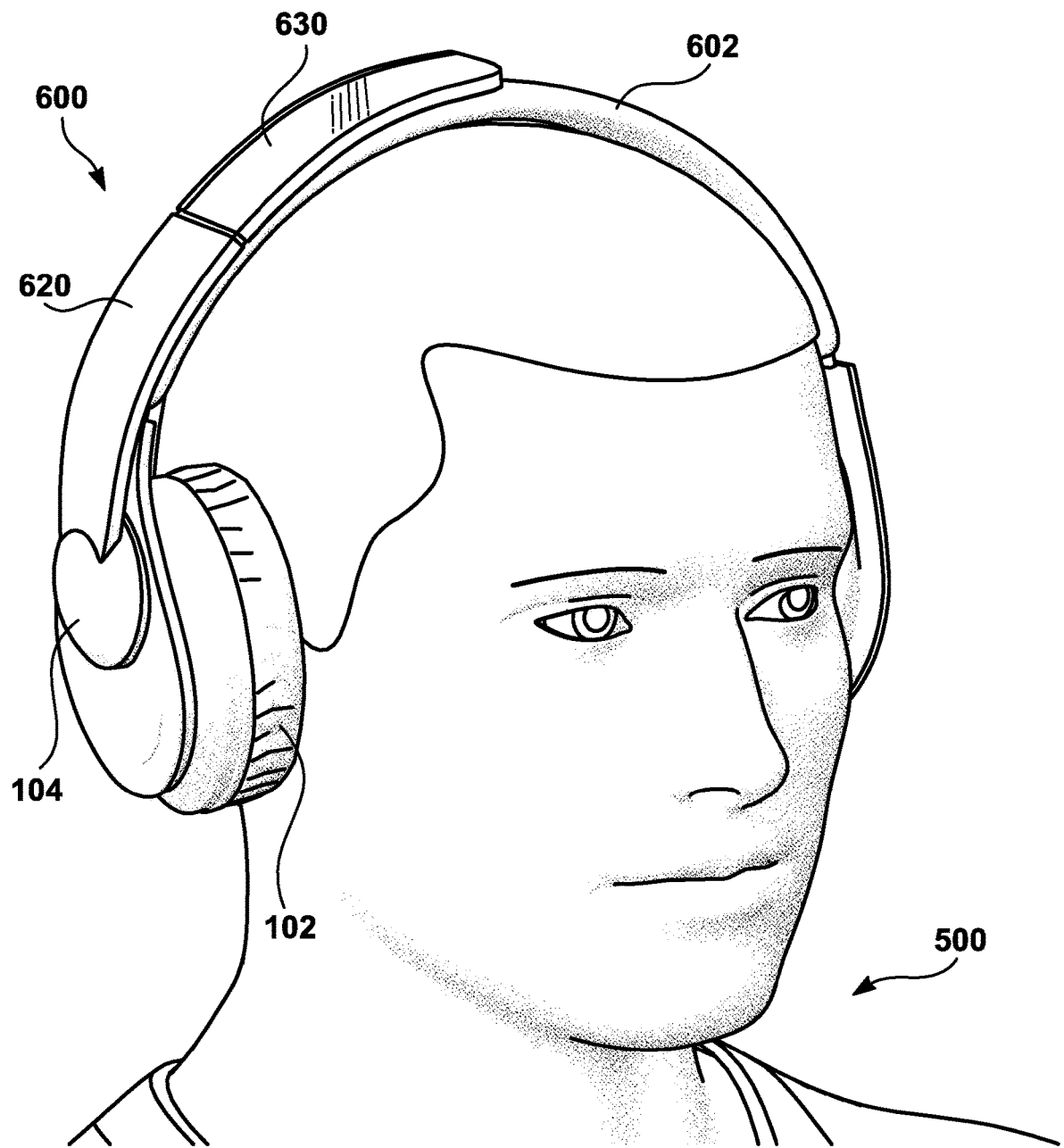
FIG. 6E illustrates a first headband member that has a partial display device to cover only one eye of the user.
Figure 6F:
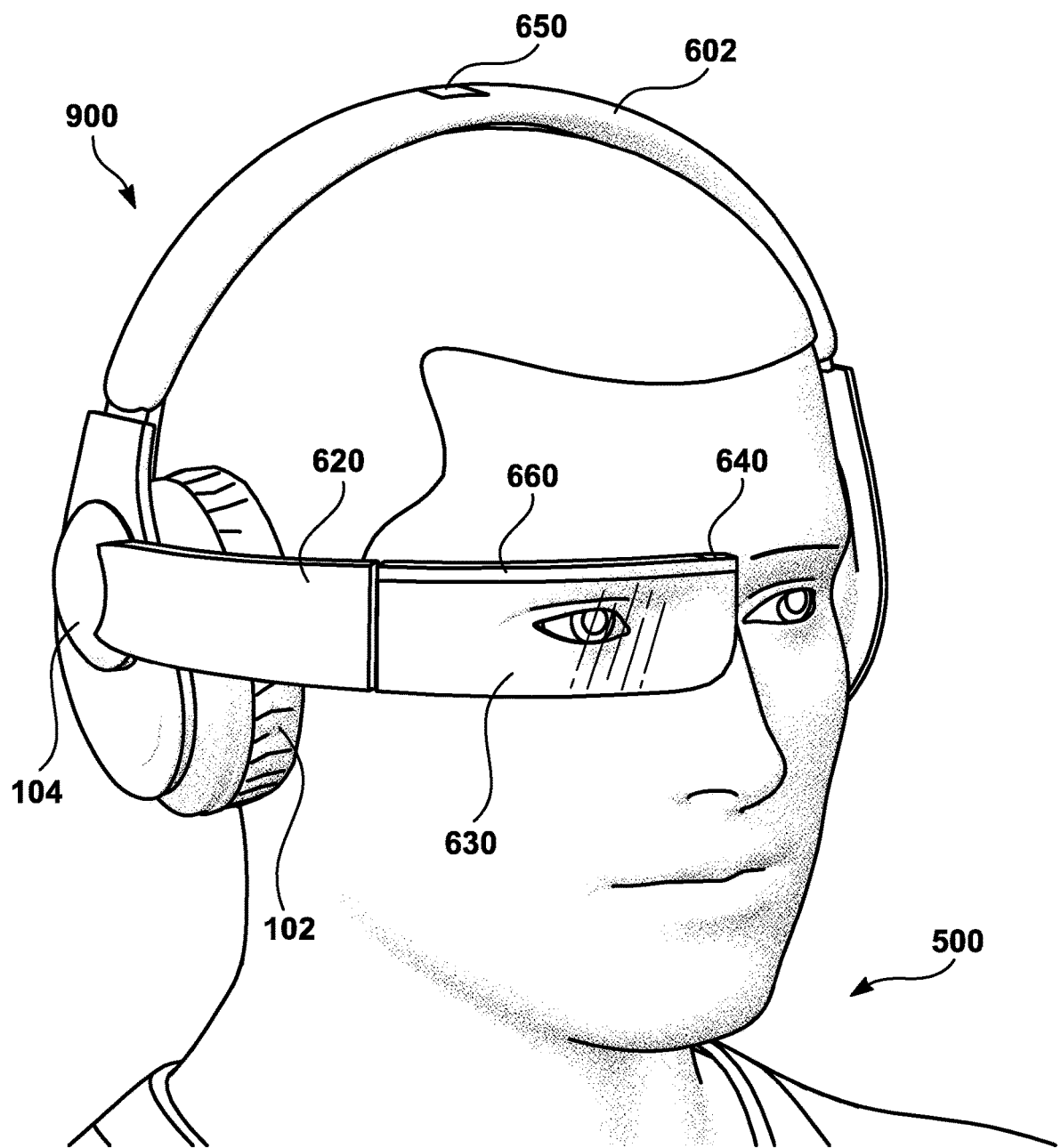
FIG. 6F illustrates the first headband member being rotated so that the partial display device covers only one eye of the user.

Although various configurations provided for herein are illustrated such that a display device 106 (FIGS. 6A-6C) is positioned over both eyes, and/or eyebrows, of the user 500, the display device of any of the configurations provided for herein may, alternatively, be positioned over just one eye, and/or eyebrow, of the user 500. For example, FIG. 6E illustrates a first headband member 620 that has an integrated, or attached, partial display device 630 to cover only one eye of the user 500. In one embodiment, the first headband member 620 is only connected to one rotatable member 104. In another embodiment, the first headband member 620 connects to both rotatable members 104 and 105, but only has a partial display device 630 that corresponds to only one eye of the user 500. FIG. 6F illustrates the first headband member 620 being rotated so that the partial display device 630 covers only one eye of the user 500. One or more connectors 640 (e.g., magnets) may be used to connect the first headband member 601 to one or more connectors 650 (e.g., magnets) positioned on the second headband member 602. In one embodiment, the connector 640 may be positioned on a non-display portion 660 (e.g., plastic, metal, etc.) of the partial display device 630. In another embodiment, the non-display portion 660 may itself be a connector (e.g., magnet) to allow for connection to the connector 650 on the second headband member 602 irrespective of telescopic adjustments to the second headband member 602. In yet another embodiment, the connector 640 may be positioned directly on the partial display device 630 (e.g., on the glass via an adhesive, one or more screws, etc.).

Figure 7A:
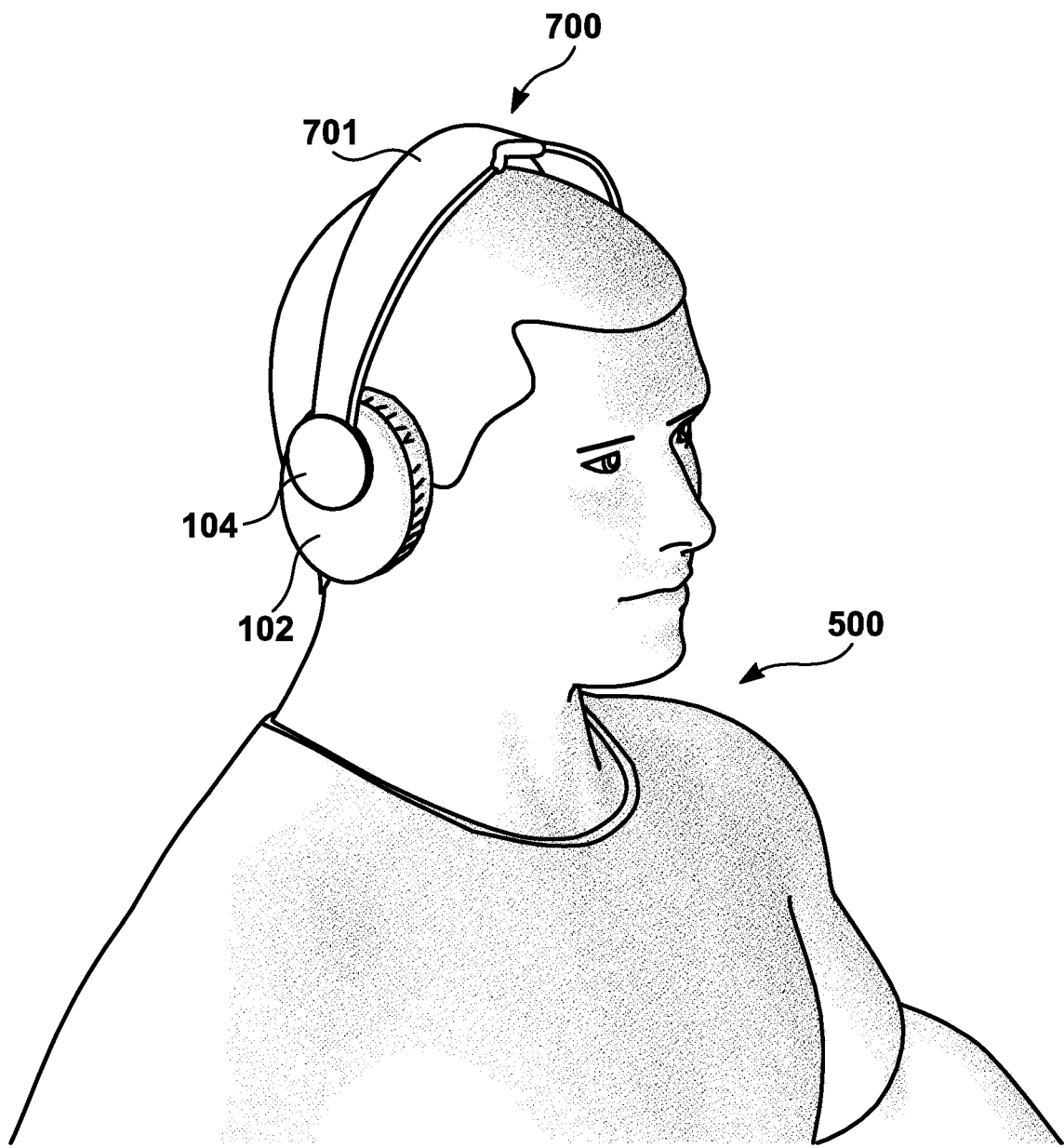
FIG. 7A illustrates the unitary headband in the headband position.
Figure 7B:
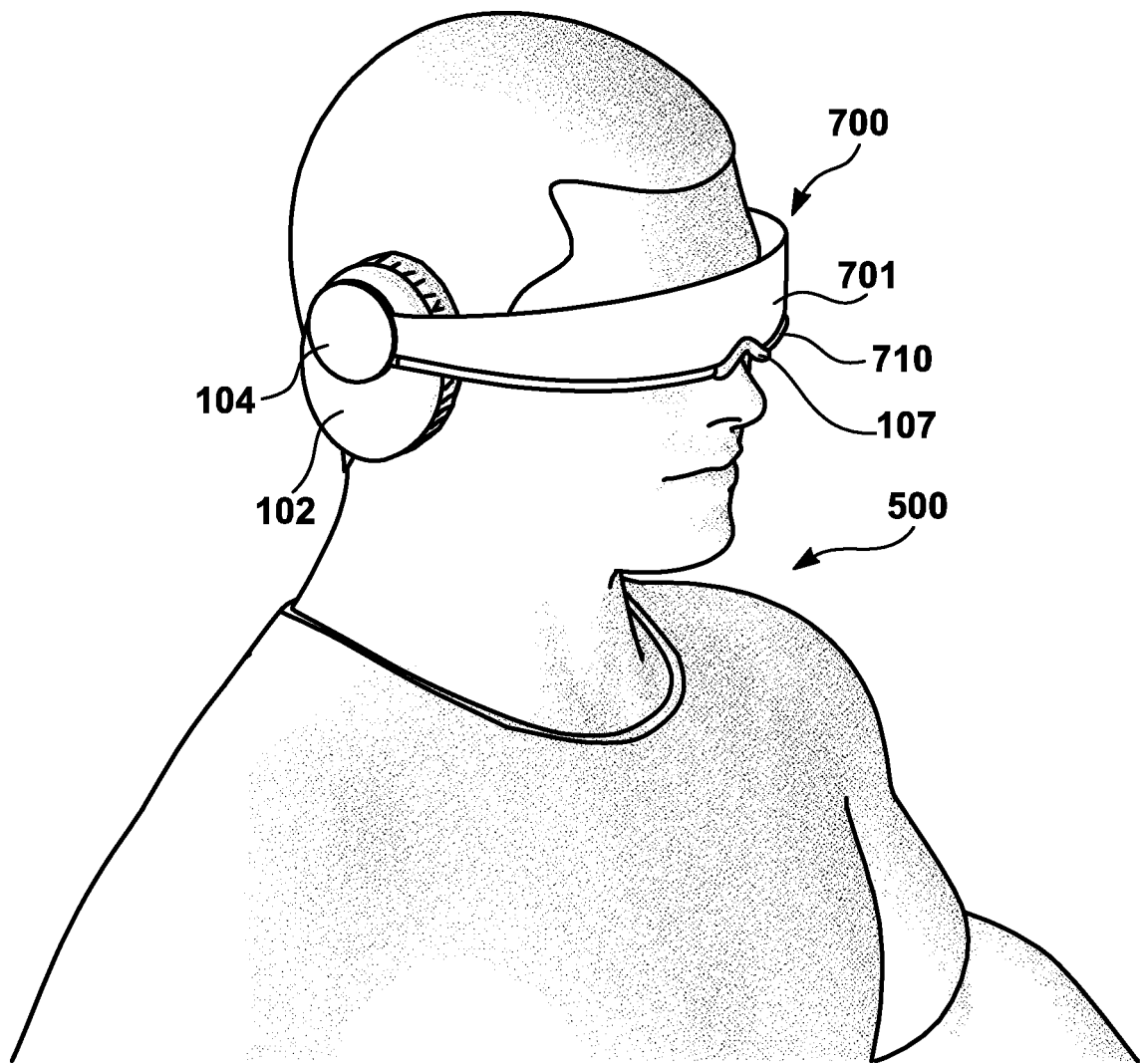
FIG. 7B illustrates the unitary headband in the VE position.

Although the display device 106 is illustrated in FIGS. 1A-6C as being connected to the headband 101, or a headband member 601, the display device 106 may, alternatively, act as one headband device. For example, FIGS. 7A and 7B illustrate a convertible headphone/VE apparatus 700 with a unitary headband 701 that acts as both a headband and display device. FIG. 7A illustrates the unitary headband 701 in the headphone position. Further, FIG. 7B illustrates the unitary headband 701 in the VE position. Given that the unitary headband acts as display device in the VE position, the VE position is established when the unitary headband is approximately positioned over one or more eyes of the user 500.

In one embodiment, a layer of material 710 is positioned along the bottom of the unitary headband. The layer of material 710 may also be positioned along the bottom of the display device 106, or in between the display device 106 and the headband 101 illustrated in FIGS. 1A-6D, thereby avoiding various artifacts (e.g., sweat, dirt, etc.) from coming into contact with the display device 106.

In another embodiment, the unitary headband 701 is connected to the rotatable members 104 and 105 via one or more extendable members to elevate the unitary headband 701 above the hair of the user 500, thereby avoiding various artifacts (e.g., sweat, dirt, etc.) from coming into contact with the display device 701.

Figure 8A:
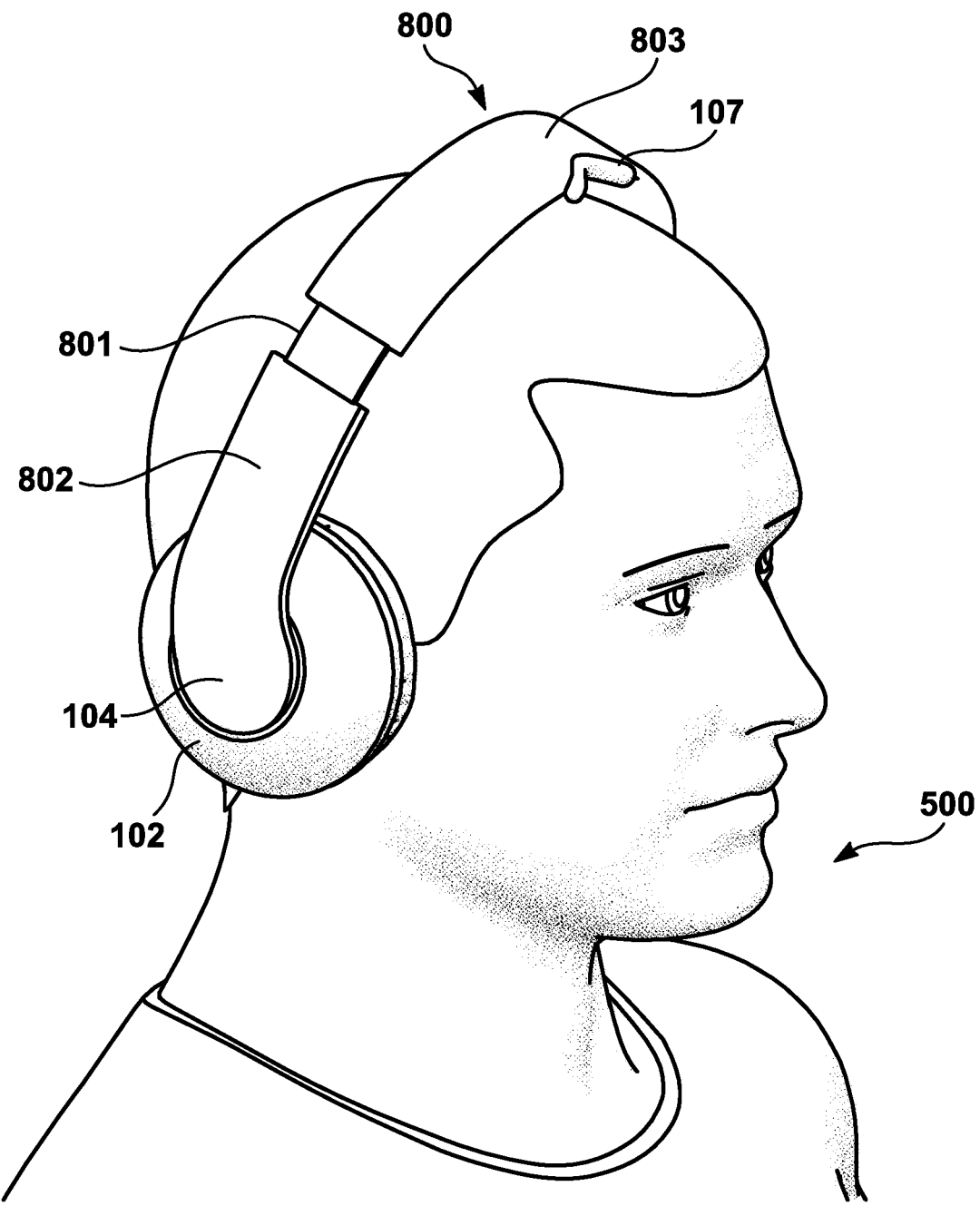
FIG. 8A illustrates an optional telescoping feature of the unitary headband when the convertible headphone/VE apparatus is in a headphone position.
Figure 8B:
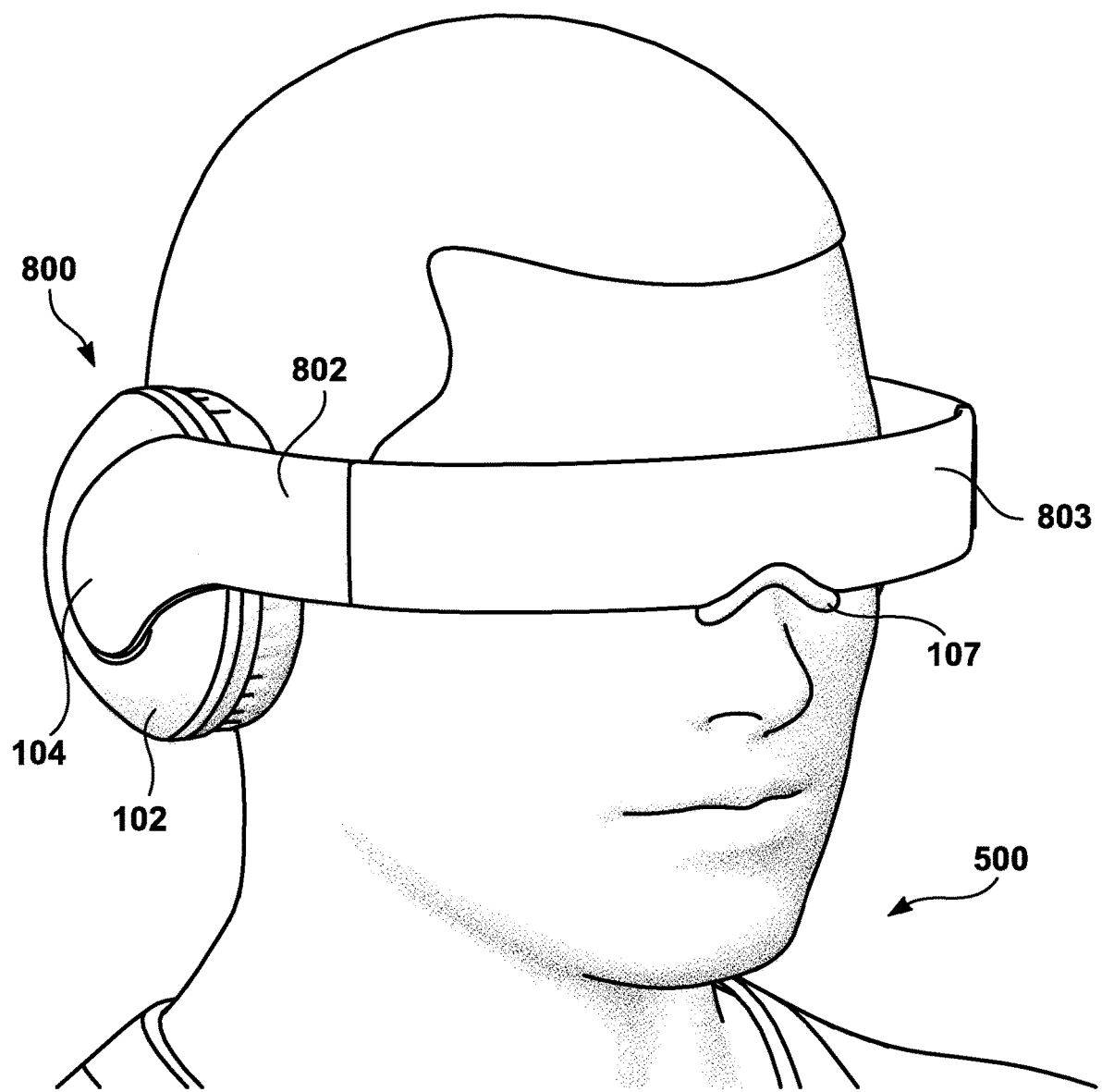
FIG. 8B illustrates the convertible headphone/VE apparatus illustrated in FIG. 8A rotated to a VE position.

FIGS. 8A and 8B illustrate a convertible headphone/VE apparatus 800 with a unitary headband that has a first portion 802 that acts only as a headband and a second portion 803 that acts both as a headband and a display device. FIG. 8A illustrates an optional telescoping feature of the unitary headband when the convertible headphone/VE apparatus 800 is in a headphone position. The second portion 803 may be extended via a telescoping portion 801 to avoid contact with hair of the user 500. In one embodiment, the first portion 802 may connect to the earpiece 102 such that the first portion 802 and the rotatable member 104 are one piece. Accordingly, the first portion 802 and the rotatable member 104, in addition to the rotatable member 105 (another first portion may be attached to the rotatable member 105), may rotate as one unit. FIG. 8B illustrates the convertible headphone/VE apparatus 800 illustrated in FIG. 8A rotated to a VE position.

The first portion 802 is illustrated in FIGS. 8A and 8B as having curvature toward the rotatable member 104; such curvature allows for placement of the rotatable member 104 toward the center of the earpiece 102 and placement of the second portion 803 such that the nosepiece 107 fits comfortably on the nose of the user 500 in a VE position.

Further, the second portion 803 may be approximately positioned over one or more eyes of the user 500 in the VE position.

Figure 9A:
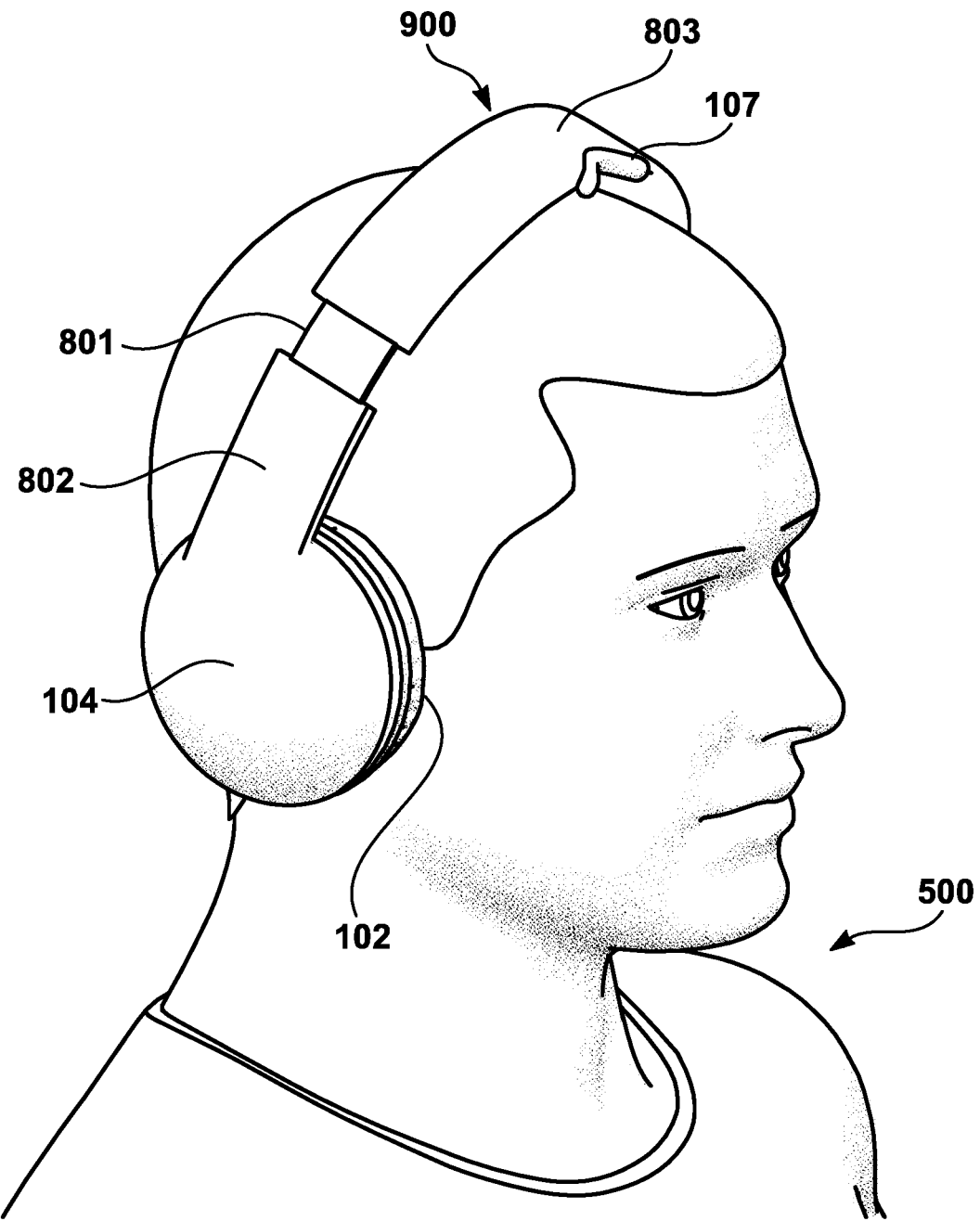
FIG. 9A illustrates the rotatable member engulfing the earpiece when a convertible headphone/VE apparatus is in an upright position.
Figure 9B:
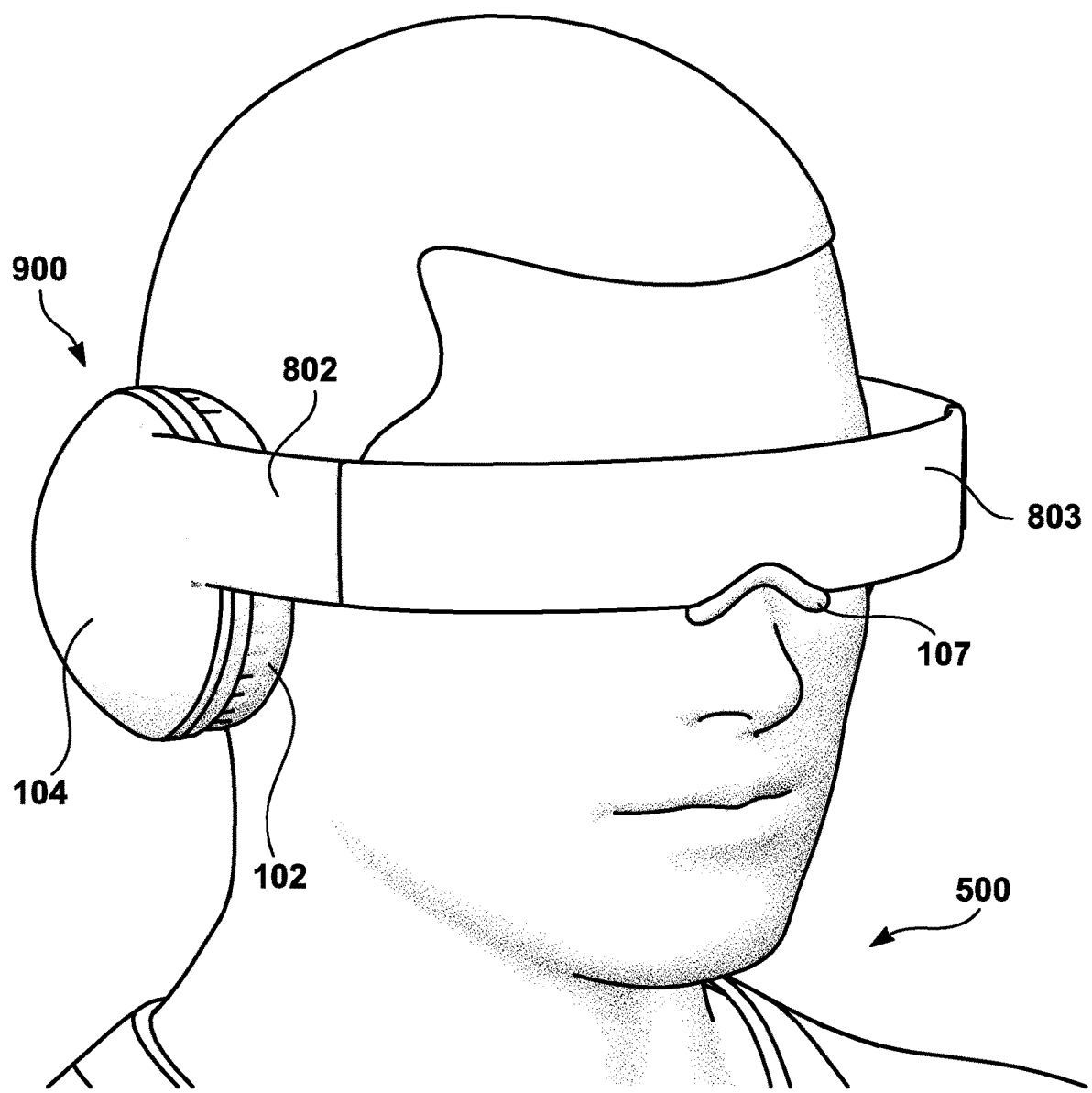
FIG. 9B illustrates the headphone/VE apparatus, illustrated in FIG. 9A, being rotated to a VE position.

In an alternative embodiment, as illustrated in FIGS. 9A and 9B, the rotatable member 104, illustrated in FIGS. 8A and 8B, substantially engulfs, or surrounds, the earpiece 102. FIG. 9A illustrates the rotatable member 104 engulfing the earpiece 102 when a convertible headphone/VE apparatus 900 is in an upright position. Further, FIG. 9B illustrates the headphone/VE apparatus 900, illustrated in FIG. 9A, being rotated to a VE position.

Figure 10A:
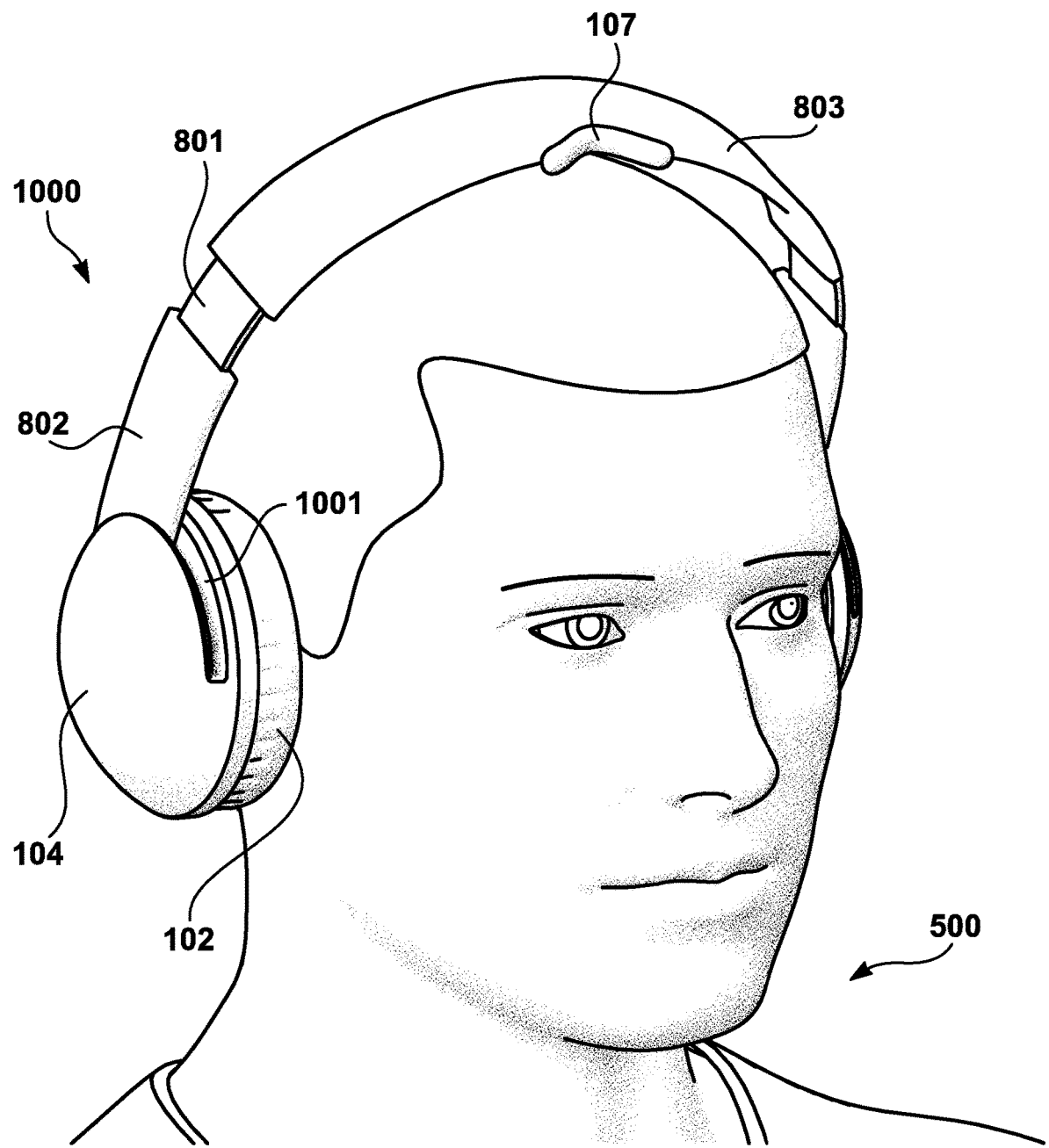
FIG. 10A illustrates a slot in the earpiece that allows for rotation of a headband of a convertible headphone/VE apparatus that is in an upright position.
Figure 10B:
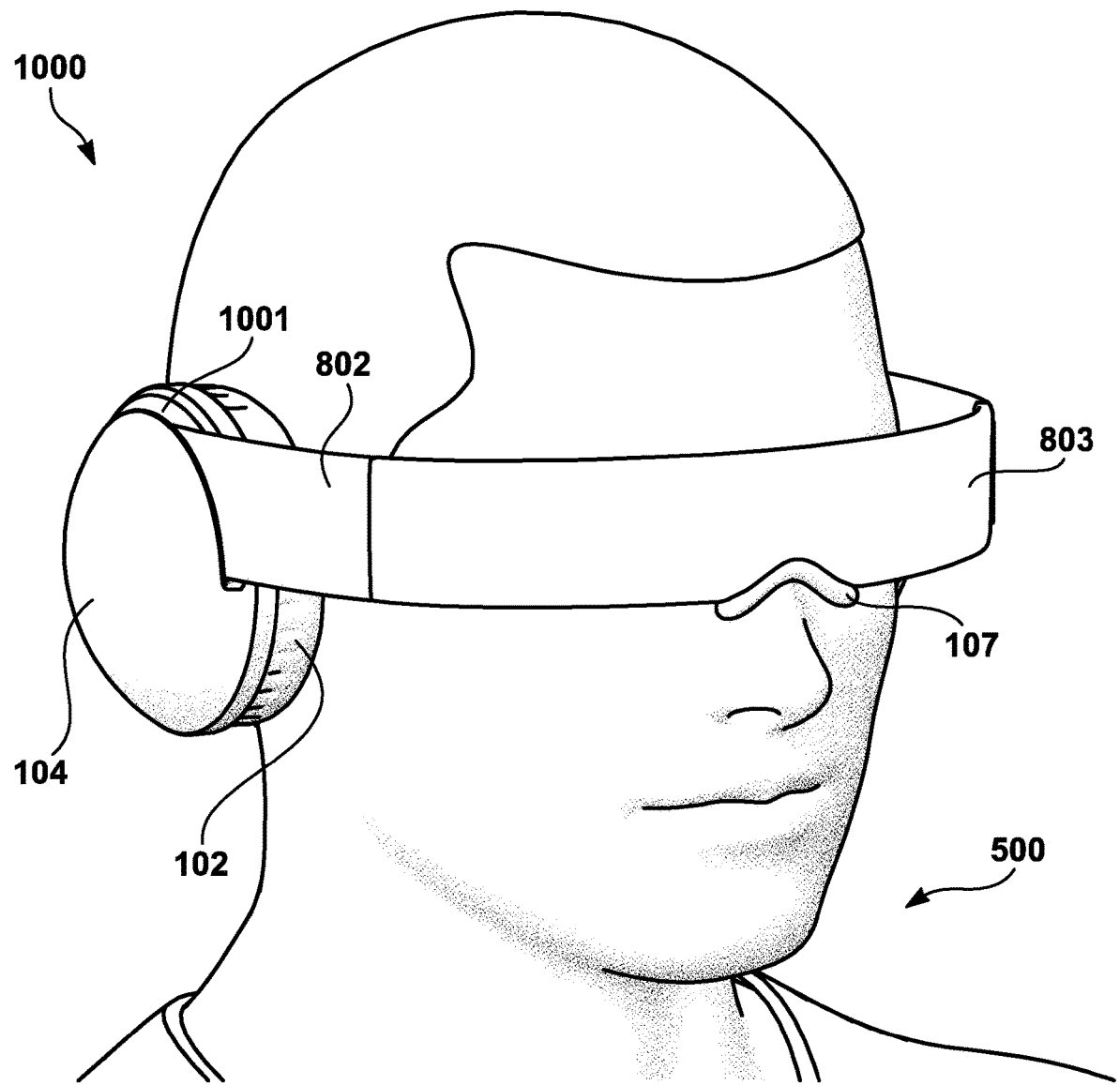
FIG. 10B illustrates the headphone/VE apparatus, illustrated in FIG. 10A, being rotated to a VE position.

In yet another embodiment, as illustrated in FIGS. 10A and 10B, the rotatable member 104, illustrated in FIGS. 8A and 8B, is positioned within the earpiece 102. FIG. 10A illustrates a slot 1001 in the earpiece 104 that allows for rotation of a headband of a convertible headphone/VE apparatus 1000 that is in an upright position. Further, FIG. 10B illustrates the headphone/VE apparatus 1000, illustrated in FIG. 10A, being rotated to a VE position.

Although particular features may be described herein with respect to one side (e.g., left earpiece, left rotatable member, left telescoping portion, etc.) for illustrative purposes, such features may be applicable to the other side (e.g., right earpiece, right rotatable member, right telescopic portion, etc.).

Figure 11:
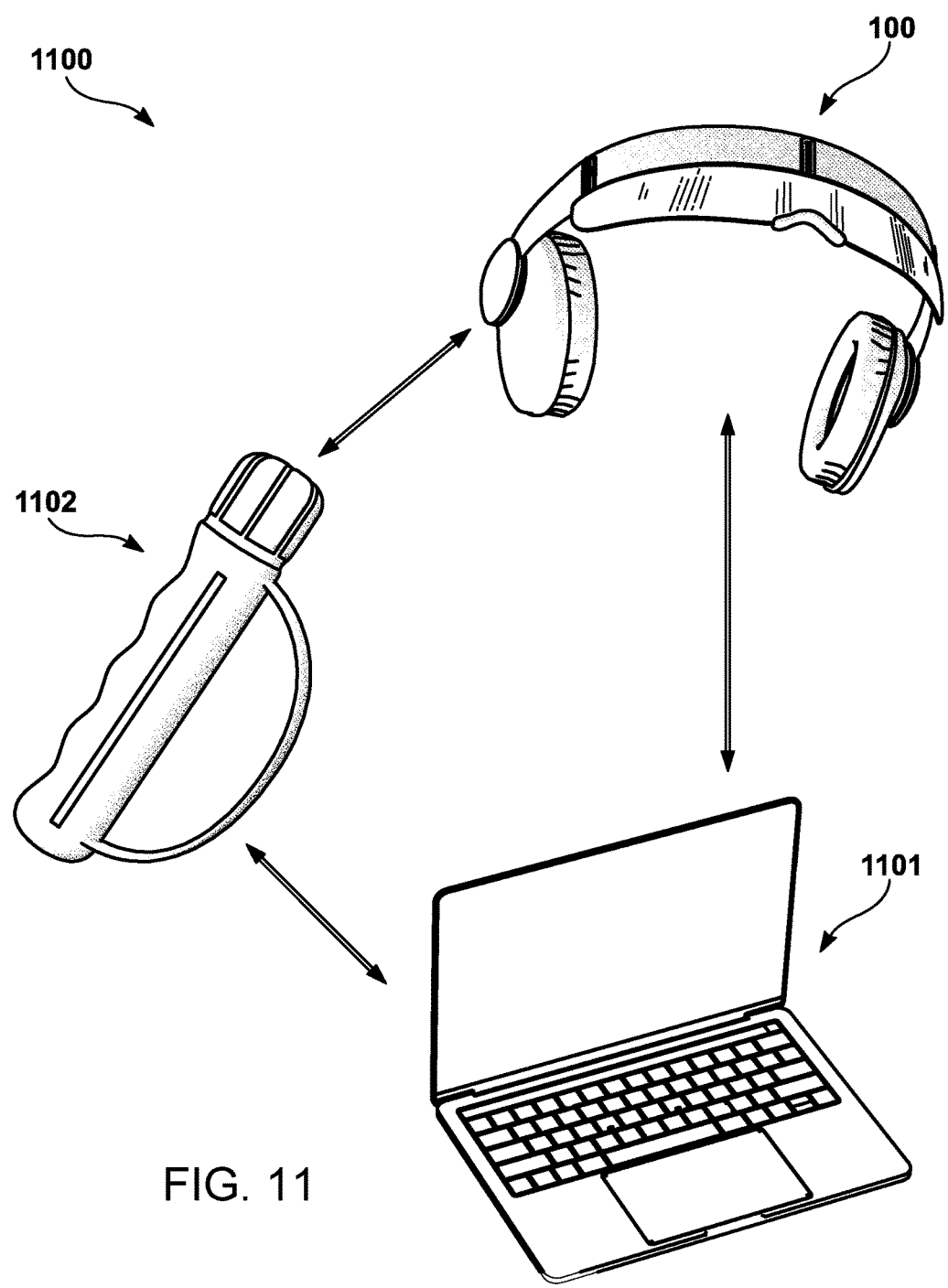
FIG. 11 illustrates an example of system configuration in which the convertible headphone/VE apparatus illustrated in FIGS. 1A-1C communicates with a computing device and an input device.

In one embodiment, the configurations provided for herein interact with one or more external computing devices (e.g., laptop computer, desktop computer, smartphone, tablet device, wearable device, etc.) to provide audio delivery and/or a VE experience. FIG. 11 illustrates an example of system configuration 1100 in which the convertible headphone/VE apparatus 100 illustrated in FIGS. 1A-1C communicates with a computing device 1101 and an input device 802. For example, the computing device 1101 may deliver (wirelessly or via a wired connection) audio to the convertible headphone/VE apparatus 100 when the convertible headphone/VE apparatus 100 is in the headphone position. The computing device 1101 may also generate content for a VE experience to be displayed by the display device 106 (FIGS. 1A-1C) of the convertible headphone/VE apparatus 100 when the convertible headphone/VE apparatus 100 is in the VE position.

Once the convertible headphone/VE apparatus 100 is operating to provide a VE experience, the input device 1102 (e.g., one or more hand controllers, wearable computing devices, smartphones, tablet devices, etc.) may be optionally used to provide one or more inputs during the VE experience (e.g., for an AR-based game). In one embodiment, the input device 1102 is a device that is distinct from the convertible headphone/VE apparatus 100. In another embodiment, the input device 1102 is integrated into the convertible headphone/VE apparatus 100 (e.g., a button positioned on the headband 101, rotatable members 104 and 105, and/or earpieces 102 and 103).

Figure 12:
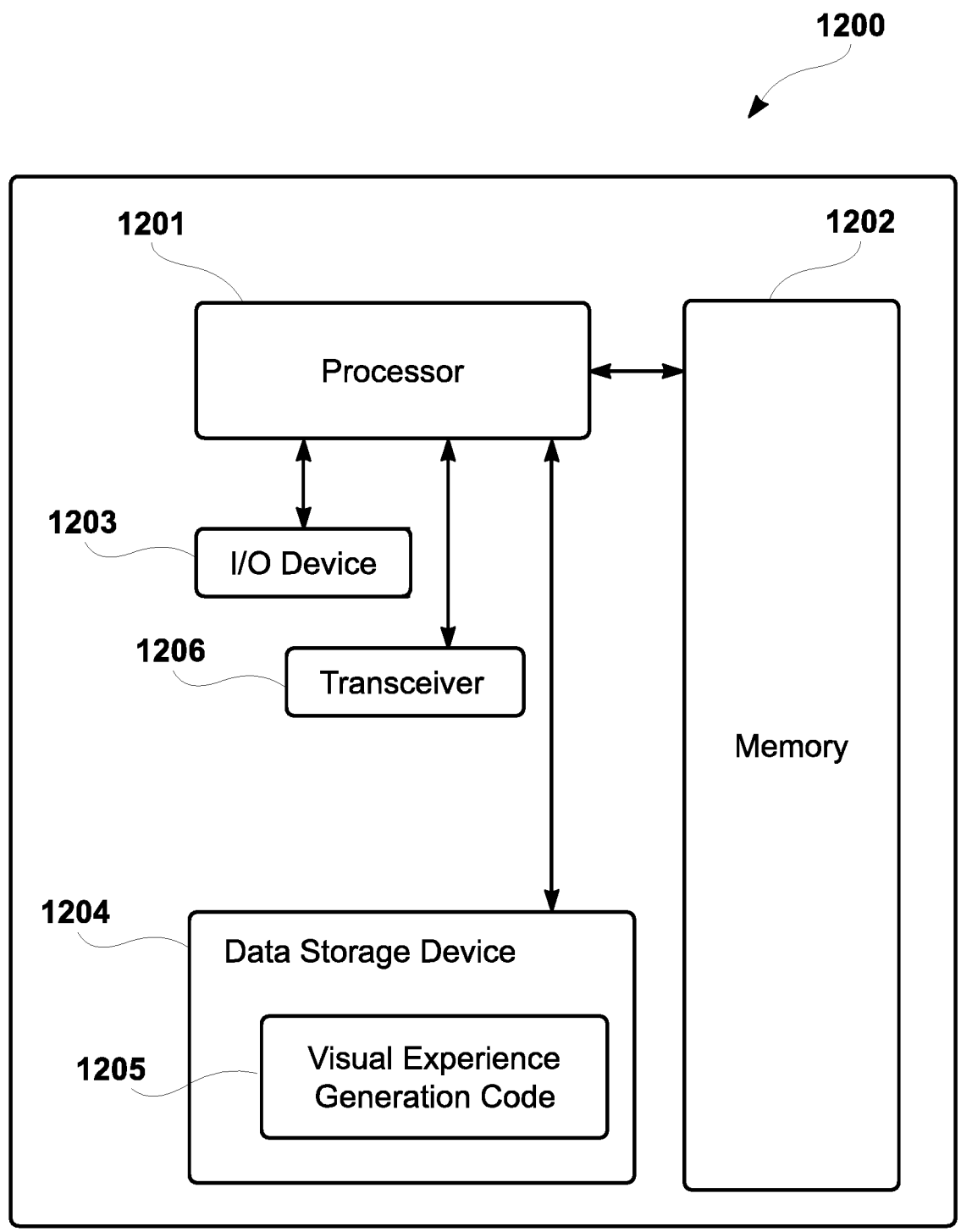
FIG. 12 illustrates a configuration of the system componentry that may be included within the convertible headphone/VE apparatus illustrated in FIGS. 1A-1C.

FIG. 12 illustrates a configuration 1200 of the system componentry that may be included within the convertible headphone/VE apparatus 100 illustrated in FIGS. 1A-1C. For example, the configuration 1200 may include a processor 1201, a memory device 1202 (e.g., random access memory ("RAM") and/or read only memory ("ROM")), one or more input/output ("I/O") devices 1203 (e.g., keyboard, mouse, pointing device, touch screen, microphone, etc.), a transceiver 1206 for establishing communication, and a data storage device 1204.

The processor 1201 uses visual experience generation code 1205, which is stored on the data storage device 1204, to generate content for a VE experience to be displayed by the display device 106 (FIG. 1) when the convertible headphone/VE apparatus 100 is in the VE position. In one embodiment, the processor 1201 is integrated within the convertible headphone/VE apparatus 100. In another embodiment, the processor 1201 is integrated within the external computing device 1101 illustrated in FIG. 11. In another embodiment, at least one processor 1201 is integrated within the convertible headphone/VE apparatus 100, and at least one processor is integrated within the external computing device 1101 illustrated in FIG. 11.

In conclusion, the configurations provided for herein allow the user 500 (FIGS. 5A-5C) to conveniently consume both audio content and VE content. The convertible headphone/VE apparatus 100 (FIG. 1) provides comfort and ease-of-use in a practical manner.

The processes described herein may be implemented in a specialized, multi-purpose or single purpose processor. Such a processor will execute instructions, either at the assembly, compiled or machine-level, to perform the processes. A computer readable medium may be any medium capable of carrying those instructions and include a CD-ROM, DVD, magnetic or other optical disc, tape, silicon memory (e.g., removable, non-removable, volatile or non-volatile, packetized or non-packetized data through wireline or wireless transmissions locally or remotely through a network).

It is understood that the processes, systems, apparatuses, and compute program products described herein may also be applied in other types of processes, systems, apparatuses, and computer program products. Those skilled in the art will appreciate that the various adaptations and modifications of the embodiments of the processes, systems, apparatuses, and compute program products described herein may be configured without departing from the scope and spirit of the present processes and systems. Therefore, it is to be understood that, within the scope of the appended claims, the present processes, systems, apparatuses, and compute program products may be practiced other than as specifically described herein.

I claim:

1. An apparatus comprising:
a left earpiece having one or more left audio speakers integrated therein;
a left rotatable member that rotates about an axis of the left earpiece while the left earpiece is stationary;
a right earpiece having one more right audio speakers integrated therein;
a right rotatable member that rotates about an axis of the right earpiece while the right earpiece is stationary;
a headband that is operably connected to the left rotatable member and the right rotatable member, the headband being rotated to a headphone position on top of a head of a user during operation of the apparatus as a set of headphones, the headband being rotated to a visual experience position at an eyebrow position of the user, wherein the headband comprises one or more retraction devices; and
a display device that is operably connected to the headband, the display device displaying the visual experience, wherein the one or more retraction devices retract the display device so that the display device is substantially flush with one or more edges of the headband in the headphone position.

2. The apparatus of claim 1, wherein the one or more retraction devices comprise one or more grooves.

3. The apparatus of claim 1, wherein the headband comprises one or more actuators that release the display device so that the display device is positioned over one or more eyes of the user in the visual experience position.

4. The apparatus of claim 1, further comprising one or more actuators that release the display device so that the display device is positioned over one or more eyes of the user in the visual experience position, the one or more actuators being integrated into at least one of the left earpiece and the right earpiece.

5. The apparatus of claim 1, wherein the display device comprises a nosepiece that is positioned over a nose of the user in the visual experience position.

6. The apparatus of claim 1, further comprising one or more layers of padding situated between the headband and the display device.

7. The apparatus of claim 1, wherein the visual experience is an augmented reality experience.

8. The apparatus of claim 1, wherein the visual experience is a virtual reality experience.

9. The apparatus of claim 1, further comprising a processor that is in operable communication with the display device to provide content for the visual experience.

10. The apparatus of claim 1, further comprising a receiver that receives, from an external computing device, content for the visual experience.

11. The apparatus of claim 1, further comprising an actuator that invokes wireless connectivity with an external computing device, the actuator being integrated within at least one of the left earpiece and the right earpiece.

12. An apparatus comprising:
a left earpiece having one or more left audio speakers integrated therein;
a left rotatable member that rotates about an axis of the left earpiece while the left earpiece is stationary;
a right earpiece having one more right audio speakers integrated therein;
a right rotatable member that rotates about an axis of the right earpiece while the right earpiece is stationary;
a first headband member operably connected to the left earpiece and the right earpiece such that the first headband member is fixed at a headphone position on top of a head of a user during operation of the apparatus as a set of headphones;
a second headband member that is operably connected to the left rotatable member and the right rotatable member, the second headband member being rotated to a headphone position on top of a head of a user during operation of the apparatus as a set of headphones, the second headband member being rotated to a visual experience position at an eyebrow position of the user;
a display device that is operably connected to the second headband member, the display device displaying the visual experience; and
one or more actuators that release the display device so that the display device is positioned over one or more eyes of the user in the visual experience position, the one or more actuators being integrated into at least one of the left earpiece and the right earpiece.

13. The apparatus of claim 12, wherein the second headband member comprises one or more retraction devices that retract the display device so that the display device is substantially flush with one or more edges of the second headband member in the headphone position.

14. The apparatus of claim 13, wherein the one or more retraction devices comprise one or more grooves.

15. The apparatus of claim 12, wherein the second headband member comprises one or more actuators that release the display device so that the display device is positioned over one or more eyes of the user in the visual experience position.

16. The apparatus of claim 12, wherein the display device comprises a nosepiece that is positioned over a nose of the user in the visual experience position.

17. The apparatus of claim 12, wherein the visual experience is an augmented reality experience.

18. An apparatus comprising:
a left earpiece having one or more left audio speakers integrated therein;
a left rotatable member that rotates about an axis of the left earpiece while the left earpiece is stationary;
a right earpiece having one more right audio speakers integrated therein;
a right rotatable member that rotates about an axis of the right earpiece while the right earpiece is stationary; and
a headband that is operably connected to the left rotatable member and the right rotatable member, the headband being rotated to a headphone position on top of a head of a user during operation of the apparatus as a set of headphones, the headband being rotated to a visual experience position at one or more eyes of the user, the headband having a left non-display device portion operably connected to the left rotatable member and a right non-display device portion operably connected to the right rotatable member, the headband having a display device portion that displays the visual experience, wherein the headband comprises one or more retraction devices that retract the display device portion so that the display device portion is substantially flush with one or more edges of the headband in the headphone position.

* * * * *